(12) United States Patent
Kroon et al.

(10) Patent No.: US 6,610,204 B1
(45) Date of Patent: Aug. 26, 2003

(54) MICROBIOLOGICAL REMOVAL OF BROMINE SALTS FROM FLUID STREAMS

(75) Inventors: Alexander Gerardus Maria Kroon, Amersfoort (NL); Cornelis Gijsbertus Van Ginkel, Wageningen (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/615,828

(22) Filed: Jul. 13, 2000

Related U.S. Application Data
(60) Provisional application No. 60/157,920, filed on Oct. 6, 1999.

(30) Foreign Application Priority Data

Jul. 14, 1999 (EP) .............................................. 99202308

(51) Int. Cl.⁷ .............................. C02F 3/34; C02F 3/28
(52) U.S. Cl. ....................... 210/601; 210/610; 210/612; 435/262.5
(58) Field of Search ................................. 210/601, 606, 210/610–612, 615, 616, 632; 435/180, 182, 244, 262, 262.5

(56) References Cited

U.S. PATENT DOCUMENTS

| | | | | |
|---|---|---|---|---|
| 3,943,055 | A | 3/1976 | Korenkov et al. | .......... 210/601 |
| 5,342,769 | A | * 8/1994 | Hunter et al. | |
| 5,891,339 | A | 4/1999 | Van Ginkel et al. | ........ 210/605 |
| 6,214,607 | B1 | * 4/2001 | Logan | |

FOREIGN PATENT DOCUMENTS

NL         7 408 898         1/1976

OTHER PUBLICATIONS

*Patent Abstracts of Japan*, 06182397, vol. 018, No. 525, (C–1257), dated May 7, 1994.
*Water Science and Technology*, vol. 25, No. 7, 1992, pp. 237–242.
*Water Research*, vol. 33, No. 4, 1999, pp. 1049–1053.
*Applied Environmental Microbiology*, vol. 61, No. 1, 1995, pp. 239–244.
*European Search Report*, dated Dec. 20, 1999.
*Patent Abstracts of Japan*, 06182397, dated Jul. 5, 1994.
*Anaerobic Removal Of Chlorate From Bleach Effluents*, Malmqvist A, Welander T, XP–000863648, Water Science And Technology, vol. 25, No. 7, 1992 pp. 237–242.
*Bromate Reduction By Denitrifying Bacteria*, W.A.M Hijnen, R. Voogt, H.R. Veenendaal, H. Van Der Jagt, D. Van Der Kooij, XP–000863649, Applied and Environmental Microbiology, vol. 61, No. 1, 1995, pp. 239–244.
*Bromate Removal In A Denitrifying Bioreactor Used In Water Treatment*, W.A.M. Hijnen, R. Jong, D. Van Der Kooji, Water Research, vol. 33, No. 4, 1999, pp. 1049–1053.

* cited by examiner

*Primary Examiner*—Fred Prince
(74) *Attorney, Agent, or Firm*—Lainie E. Parker

(57) ABSTRACT

A process for the removal of undesirable bromine salts from fluid streams, especially waste and/or drinking water, comprising the step of exposing the fluid stream to a microorganism which biochemically aids the reduction of the undesirable bromine salts, characterized in that the microorganisms belong to the group of pure and/or enrichment strains of bacteria grown on one or more of the following: perchlorate, chlorate, and bromate, or belong to bromate respiring bacteria.

19 Claims, 25 Drawing Sheets

MICROBIOLOGICAL REMOVAL OF BROMINE SALTS FROM FLUID STREAMS

This Non-provisional Application claims priority based on U.S. Provisional Application Serial No. 60/157,920, filed Oct. 6, 1999, and claims priority based on European Patent Application No. 99202308.5, filed Jul. 14, 1999.

BACKGROUND OF THE INVENTION

Fluid streams including "drinking" water, as well as effluents, originating from various chemical processes at production sites can contain mixtures of chlorate and bromate. This creates an environmental problem, since it has been demonstrated that bromate has carcinogenic properties and that chlorate is highly toxic to bladder wrack. Chlorate and bromate can be removed from industrial effluents by chemical reduction, but this is expensive and introduces new chemicals into the environment.

Bromate is formed as a by-product of the ozonation of bromide-containing waters. Ozonation is one of the promising alternatives to chlorination, since it avoids the formation of hazardous adsorbable organic halogen (AOX) by-products. The level of bromate found in ozonated drinking water depends on many factors, including the natural level of bromide in the source water and the ozone dose. Typical concentrations of bromate found in ozonated water are in the range of 3–50 $\mu$g/l The World Health Organisation (WHO) has proposed a level of 0.5 $\mu$g/l bromate for drinking water in the last revision of their guidelines (WHO, 1993), but based on the present analytical feasibilities a provisional level of 25 $\mu$g/l was recommended. Because these concentrations may be exceeded by the common ozonation practice, efficient methods to decrease the level of bromate in ozonated water are needed.

It is an object of the present invention to provide an improved process for dealing with this problem.

SUMMARY OF THE INVENTION

The present invention provides a process for the removal of undesirable bromine salts from fluid streams, especially waste and/or drinking water streams, comprising the step of exposing the fluid stream to a micro-organism which biochemically aids the reduction of undesirable bromine salts, wherein the micro-organism can transform an energy source in the fluid stream into an electron donor, with the bromine salts functioning as electron acceptors to subsequently accept electrons from the donor thus being reduced.

DETAILED DESCRIPTION OF THE INVENTION

Figure 1:
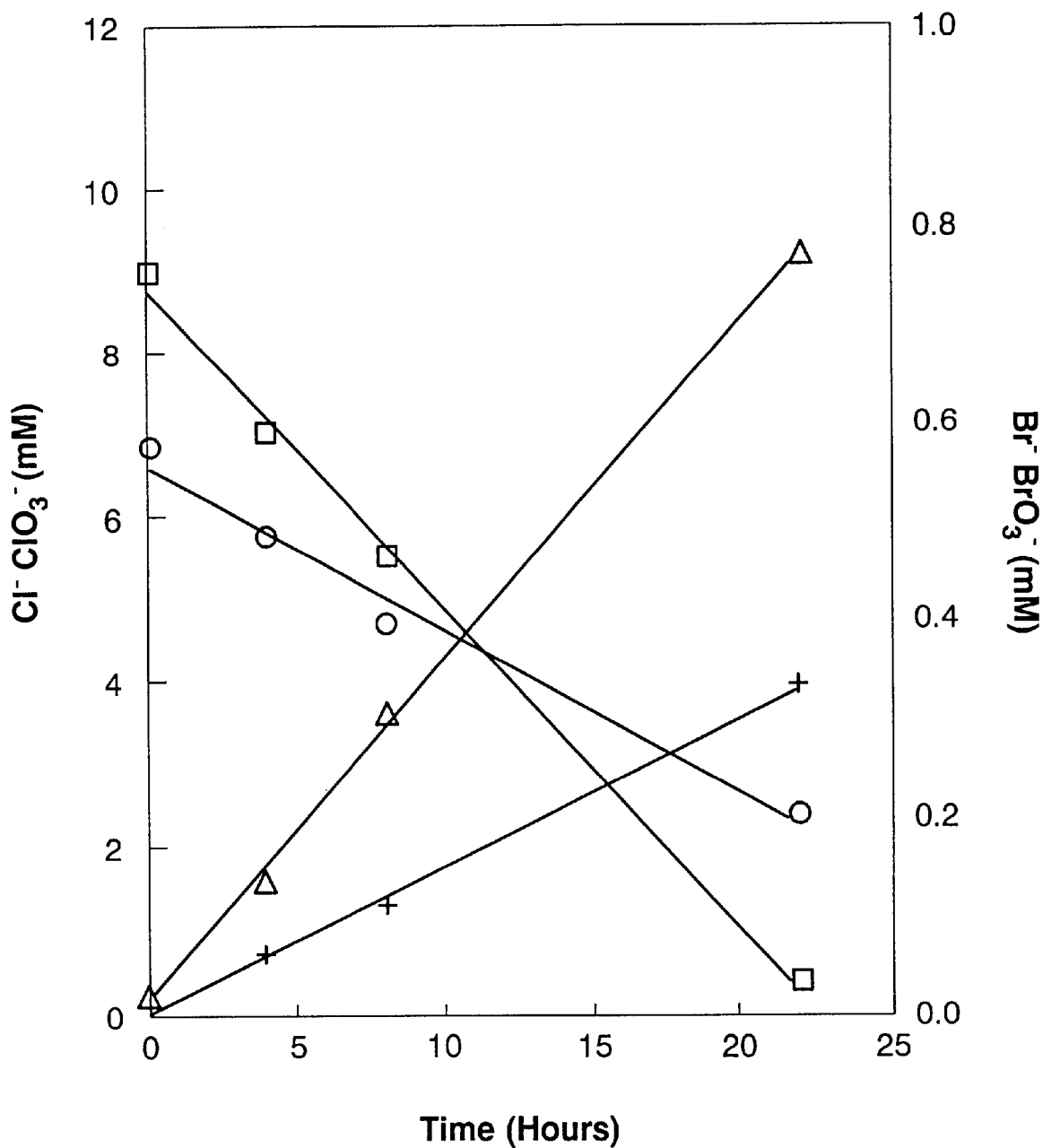
FIG. 1 shows the degradation of both chlorate (□) and bromate (○) and the concomitant formation of chloride (Δ) and bromide (+) in the presence of acetate by a washed cell suspension of chlorate-grown micro-organisms.

The inventors have shown that it is possible to microbiologically remove undesirable bromine salts, in particular bromate, from fluid streams.

The electron donor preferably comprises a carbon source and/or hydrogen gas wherein the carbon source may comprise: carbon dioxide, acetate, propionate, ethanol, methanol, succinate, malate, lactate, formate, glucose, and glycine.

Apart from bromate, the electron acceptor may also comprise chlorate and/or perchlorate, since the inventors have observed that bromate conversion rates increased remarkably when the micro-organisms were grown using (per)chlorate as the electron acceptor.

The micro-organisms may be obtained by enrichment of the activated sludge or other sources of micro-organisms with the energy source and the electron acceptor under anaerobic conditions and/or may be obtained by means of cultivating an isolated micro-organism. Micro-organisms may be used in the form of washed cell suspensions.

An isolated micro-organism may comprise a bacterium of the β subgroup of protobacteria such as the strain designated GR1.

The reduction of undesirable salts may be carried out at a pH of between 4–11, for example 5–10, preferably 6–10, and most preferably 7.5–9.5, and at a temperature of between 20–40° C., preferably 30–35° C.

Secondly, the invention provides the use of a micro-organism, for instance GR1, for reducing bromate to bromide.

Further, the present invention provides a process for reducing chlorate and/or bromate to a halide ion in a waste water stream emitted from a plant where electrolysis is carried out, the hydrogen gas stream emitted from the electrolysis being utilized as an energy source for micro-organisms, which in turn transform the hydrogen into an electron donor, which in turn reduces the chlorate and/or bromate in the waste stream to chloride and bromide, respectively.

The invention will now be elucidated by way of the following description with reference to the figures and tables.

A first series of experiments was carried out to investigate (i) the conversion of chlorate and bromate by chlorate- and nitrate-reducing micro-organisms in batch and continuous cultures, (ii) the toxicity of bromate (chlorate) to these cultures, and (iii) the combined removal of chlorate and bromate from a model waste water.

1. Materials and Methods 1.1 Chemicals

Potassium bromide was purchased from J. T. Baker, Deventer, The Netherlands. All other chemicals were purchased from Janssen Chimica, Beerse, Belgium.

1.2 Inoculum

Activated sludge used as inoculum was obtained from an aeration tank of a plant treating predominantly domestic waste water.

1.3 Medium and Model Waste Water

The mineral salts medium used contained 2 g/l of the following minerals (per litre deionised water): 1 g $NaClO_3$ or 1 g sodium nitrate; 0.10 g $MgSO_4 \cdot 7H_2O$; 0.50 g $(NH_4)_2HPO_4$; 3.10 g $K_2HPO_4$; 1.70 g $NaH_2PO_4$; 1.7 mg $Na_2$ml trace element solution according to Vishniac and Santer. The final pH of the solution was 7.2. Various amounts of sodium bromate were added to the mineral salts medium to obtain the required concentrations used in the experiments, sodium acetate (2 g/l) was added as the sole source of carbon and energy.

The model waste water was based on the (average) concentrations of chlorate and bromate in industrial effluents. The waste water contained 12 mM sodium chlorate and 1.2 mM sodium bromate (ratio 10:1) and mineral salts as described above.

1.4 Analytical Procedures

Chloride was analysed by means of volumetric precipitation with silver nitrate. The equivalence point of the titration was determined potentio-metrically using a titro-processor model 672 and a dosimat 655 (Methrom AG, Herisau, Switzerland). The bromide was determined by the standard addition method using a solid state bromide electrode (model 94–35, Orion Research, Cambridge, USA) coupled to an mV meter (Consort P207, Salm-Kipp bv, Breukelen, The Netherlands). The nitrate was determined calorimetrically by the formation of 4-nitro-2,6-dimethylphenol from 2,6-dimethylphenol in an acidic solution (Dr. Lange, Kesteren, The Netherlands).

The non-purgeable organic carbon (NPOC) was determined using a TOC apparatus (Dohrmann DC-190, Rosemount Analytical Inc. Santa-Clara, USA). Micro-organisms were removed by centrifugation (10 min, 10,000 g), and the samples were acidified to enable the removal of carbon dioxide by purging with oxygen prior to injection into the apparatus.

The bromate and chlorate were determined using a capillary zone electrophoresis apparatus (Prince, Lauerlabs, Emmen, The Netherlands). The CZE apparatus had a fused silica column (ID 50 μm, length 725 mm) and was equipped with a UV absorbance detector (Applied Biosystems 759 A, Foster City, USA) at 250 nm. The voltage setting for the electrophoresis was −30 kV in a buffer consisting of a mixture of pyromellitic acid, 2.3 mM, sodium hydroxide, 3.3 mM, and hexamethonium hydroxide, 1.3 mM, at pH=5. The hydrodynamic injection conditions were 0.2 min at 30 mbar.

1.5 Enrichment and Characterisation of Chlorate- and Nitrate-Reducing Micro-Organisms The enrichment of chlorate- and nitrate-reducing bacteria was carried out in a continuous culture (volume 700 ml). Initially the reactors were inoculated with activated sludge. The temperature of the reactors was maintained at 30° C. The dilution rate was 0.05 $h^{-1}$. The reactors were continuously flushed with nitrogen at a rate of 1 l/h. The pH of the reactors was controlled at 7.0 using 0.5 M phosphoric acid. Chlorate reduction was followed by the determination of chloride in the effluent, and nitrate reduction by the determination of nitrate. After an adaptation period of 2–4 weeks, bromate was added to the influent. The enrichment culture was characterised through Gram staining and morphology by microscopic examination (1000 times magnification). The culture was streaked on selective agar plates containing chlorate, 9 mM, and acetate, 24 mM, in a mineral salts medium.

1.6 Toxicity Test

The toxicity of bromate to the mixed culture was determined in 100 ml batch cultures containing 24 mM acetate and 9 mM chlorate in a mineral salts medium. These cultures were inoculated with 1 ml of an exponentially growing culture. Bromate was added to the batch cultures in order to obtain a concentration range in a geometric series. These cultures were anaerobically incubated at 30° C. in a water bath. The turbidity was measured using a Nephelometer (Hach Ratio XR, Loveland, USA). The turbidity was plotted against time for each of the concentrations and the control. The growth was derived from the slope of the regression line in a plot of In OD 660 versus time. The percentage inhibition of the growth at each concentration was calculated. The $EC_{50}$ values were computed from the best fitted line (least square method) through the points given by the probit of the percentage of inhibition and the logarithm of the concentration of the compound. Confidence limits were calculated on the basis of Fieller's theorem. All computations were performed using a statistical software program (SAS, Cary, N.C., USA).

1.7 Batch Experiments With Washed Cell Suspensions

Batch experiments were performed using washed cell suspensions from the continuous culture described in section 2.5. The cell suspensions were prepared by centrifugation of an amount of culture (500 ml) at 10,000 g for 15 minutes at 4° C. The resulting pellet was washed twice with phosphate buffer (100 mM) and resuspended in the same buffer (150 ml) after the final centrifugation step. This suspension was incubated anaerobically at 30° C. after the addition of the respective amounts of electron acceptor (chlorate, bromate) and carbon source (acetate). At various time intervals the formation of bromide and chloride was determined, as was the concentration of bromate and chlorate.

1.8 Continuous Culture Experiments

A continuous culture (working volume 700 ml) was operated with the model waste water. The reactor was inoculated with the chlorate-reducing culture. A continuous feed was started with a dilution rate of $0.02\ h^{-1}$. The bromide and chloride concentrations were determined when steady state conditions were ireached. Steady state conditions were supposed to be reached after a total of 3 replacements of the working volume of the reactor. The reactor was operated at 30° C. and controlled at pH=7 using 1 M phosphoric acid.

1.9 Degradation of Chlorate/Bromate by Nitrate-reducing Bacteria

A continuous culture inoculated with activated sludge was operated at a dilution rate of $0.05\ h^{-1}$ for 4 weeks with nitrate as sole electron acceptor. Bromate was subsequently added to this reactor in a concentration of 0.1 mM. The bromate concentration was gradually increased to a concentration of 1.2 mM. Reduction of the bromate was followed by determination of the bromide in the effluent. Only limited amounts (<0.05 mM) of bromide were detected in the effluent even after six weeks of operation, which indicates that there is only limited conversion of the bromate by nitrate-reducing bacteria.

1.10 Enrichment and Characterisation of Chlorate/Bromate-reducing Bacteria

A continuous culture was started with chlorate as electron acceptor. The bromate concentration in the influent of the reactor was gradually raised from 0.1 to 1.2 mM within a period of 2 weeks. Removal of the bromate and chlorate was followed by determination of the bromate and chlorate (respectively) in the effluent. Both the chlorate and the bromate were reduced completely by the mixed culture, as indicated by the near stoichiometric amounts of bromide and chloride in the effluent. The mixed culture of chlorate/bromate-reducing bacteria was examined microscopically and consisted primarily of 2 strains. Both strains were Gram negative motile rods. One strain produced small cream-coloured colonies on agar plates, the other large beige-coloured colonies.

1.11 Degradation of Bromate and Chlorate by Washed Cell Suspensions

Chlorate and bromate degradation was also followed in a batch culture with acetate as sole source of carbon and energy (24 mM) and chlorate (9 mM) and bromate (0.6 mM) as electron acceptors. The degradation of chlorate and bromate and the stoichiometric formation of chloride and bromide demonstrate that the reduction of the chlorate and the bromate was initiated by the washed cell suspension at the same time (FIG. 1). In the presence of an excess of acetate complete reduction of the chlorate was observed, while the bromate was degraded to a lower extent (60% removal).

Figure 2:
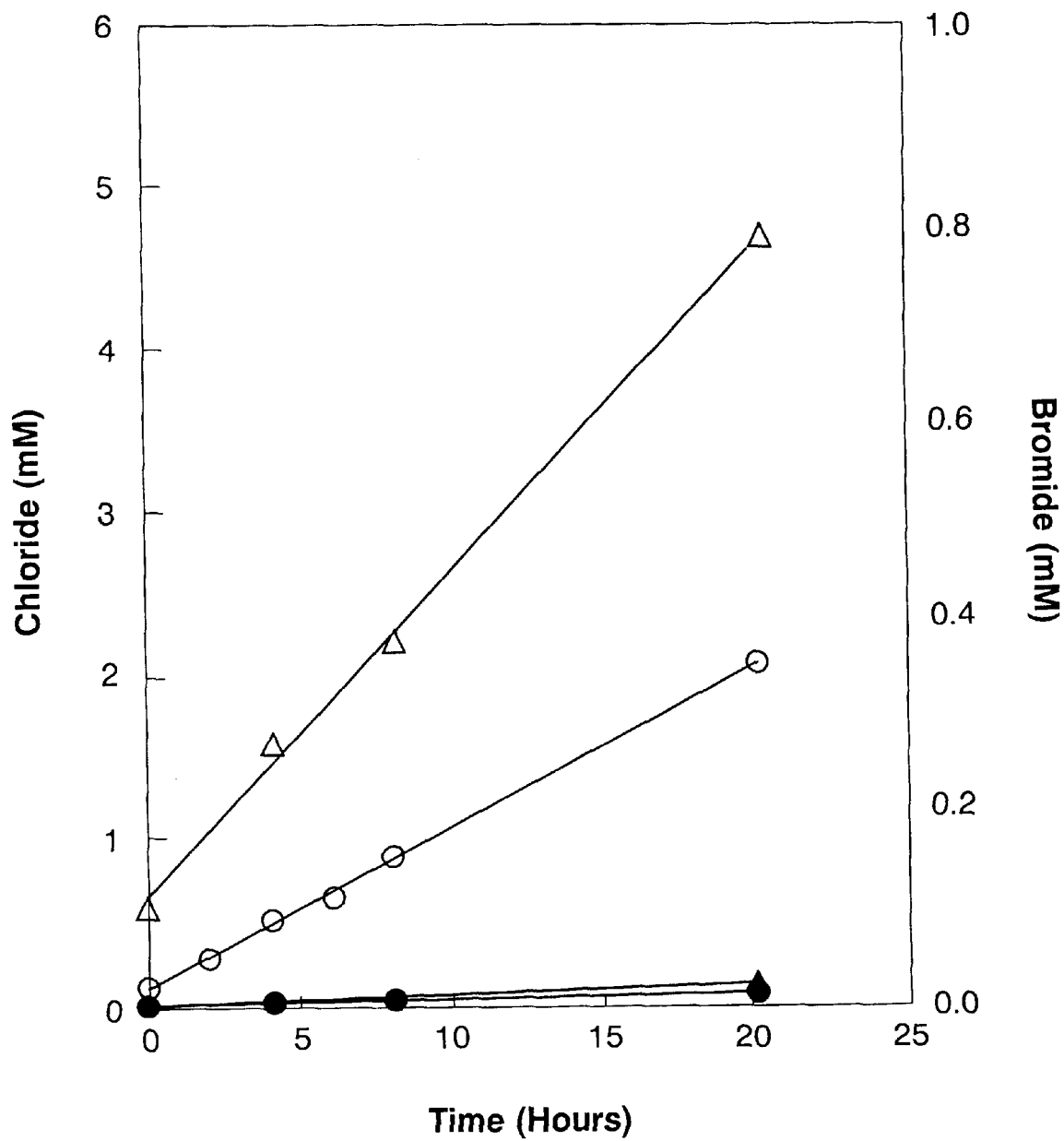
FIG. 2 shows the formation of chloride (Δ) and bromide (○) in the presence (open) and absence (closed) of acetate.
Figure 3:
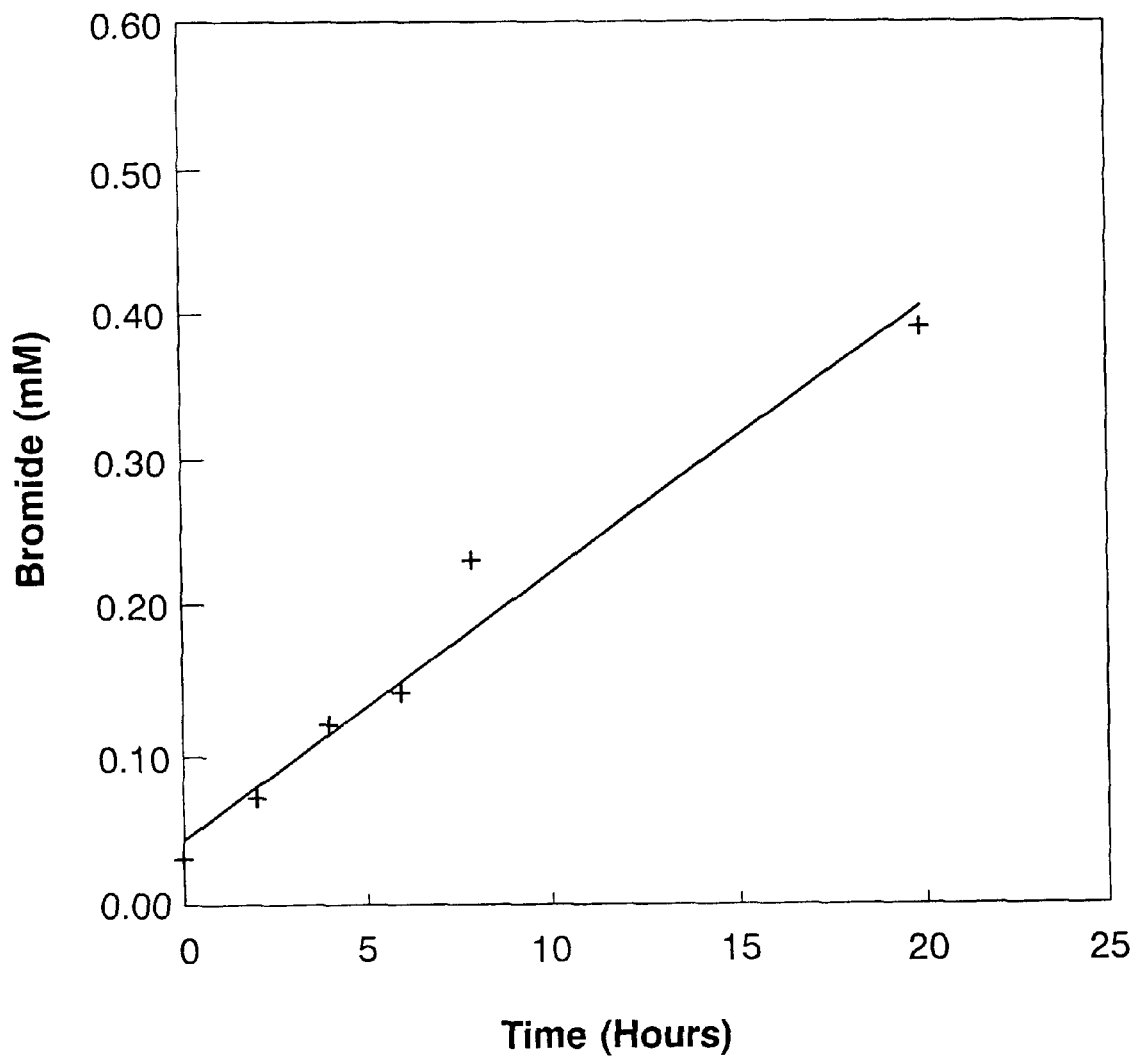
FIG. 3 shows the bromate reduction by a washed cell suspension in the absence of chlorate.

The influence of acetate on the degradation of chlorate and bromate by washed cell suspension was examined in the presence and absence of acetate (FIG. 2). In a batch culture chlorate (6 mM) and bromate (0.6 mM) were reduced to chloride and bromide in the presence of acetate (24 mM) as sole source of carbon and energy. In the absence of acetate, chloride and bromide were only detected in minor amounts. In another batch culture only bromate (0.6 mM) was incubated with a washed cell suspension of chlorate-reducing bacteria. As shown in FIG. 3, the reduction of the bromate started immediately, as indicated by the formation of bromide. After an incubation period of 20 hours approximately 60% of the bromate was recovered as bromide.

1.12 Toxicity of Bromate to the Mixed Culture

Figure 4:
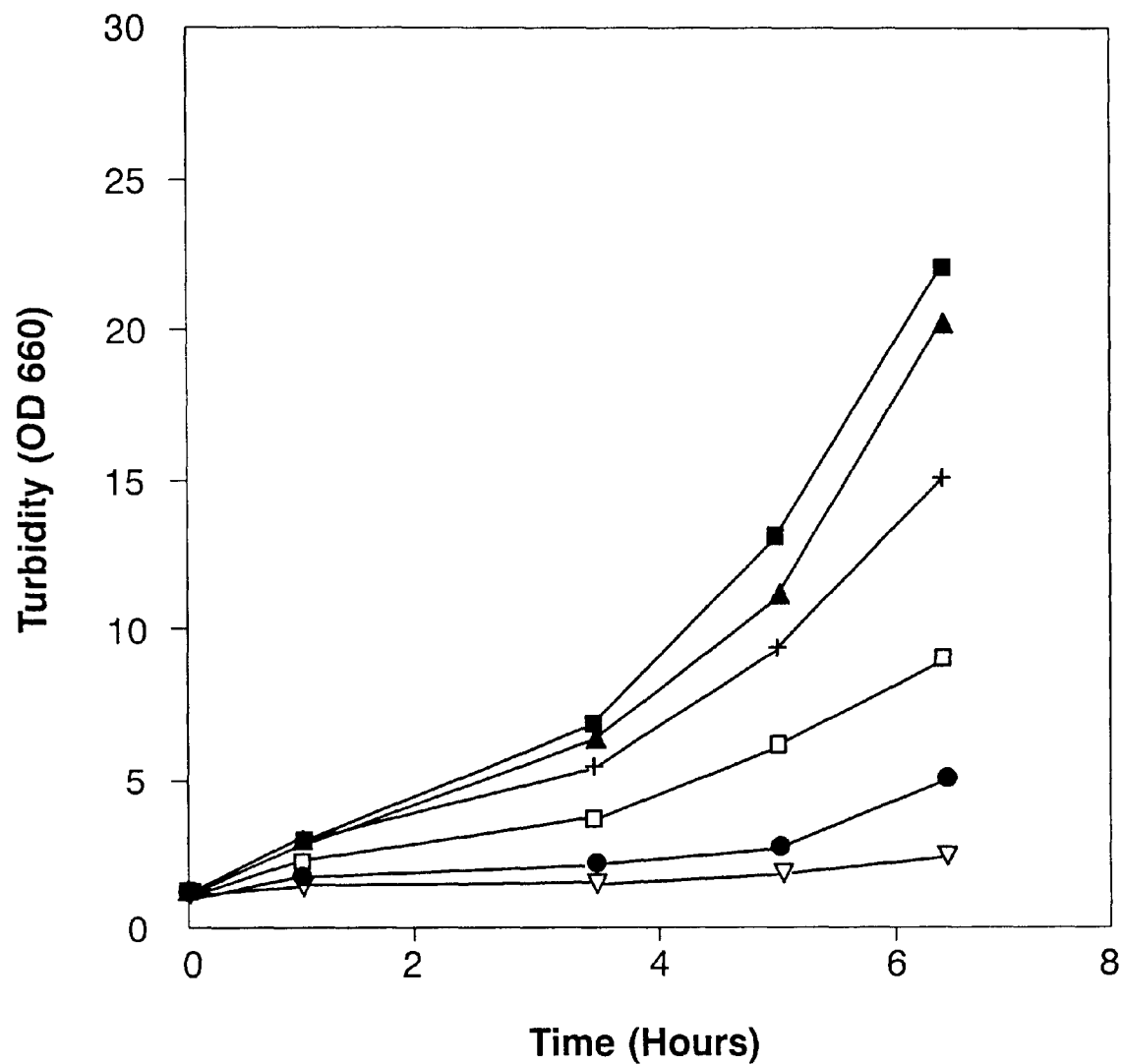
FIG. 4 shows the growth curves of a mixed culture in the presence of various concentrations of bromate: control (■), 0.3 mM (▲), 0.6 mM (♦), 1.2 mM (□), 2.4 mM (▽) bromate.

The toxicity of bromate to the mixed culture was tested in batch cultures supplemented with 0.3, 0.6, 1.2, 2.4, and 4.8 mM bromate. Growth was followed for approximately 8 hours. The growth rate of the chlorate-reducing mixed culture, calculated from the control curve, was $0.42\ h^{-1}$ (FIG. 4). As shown in FIG. 4, growth was inhibited slightly at a concentration of 0.3 mM bromate, and complete inhibition of growth was observed at a concentration of 4.8 mM. From the growth curves an $EC_{50}$ value of 2.42 mM (2.21–2.67 95% confidence limits) for bromate was calculated. In separate experiments it was demonstrated that chlorate was not toxic to the mixed culture up to a concentration of 12 mM.

Figure 5:
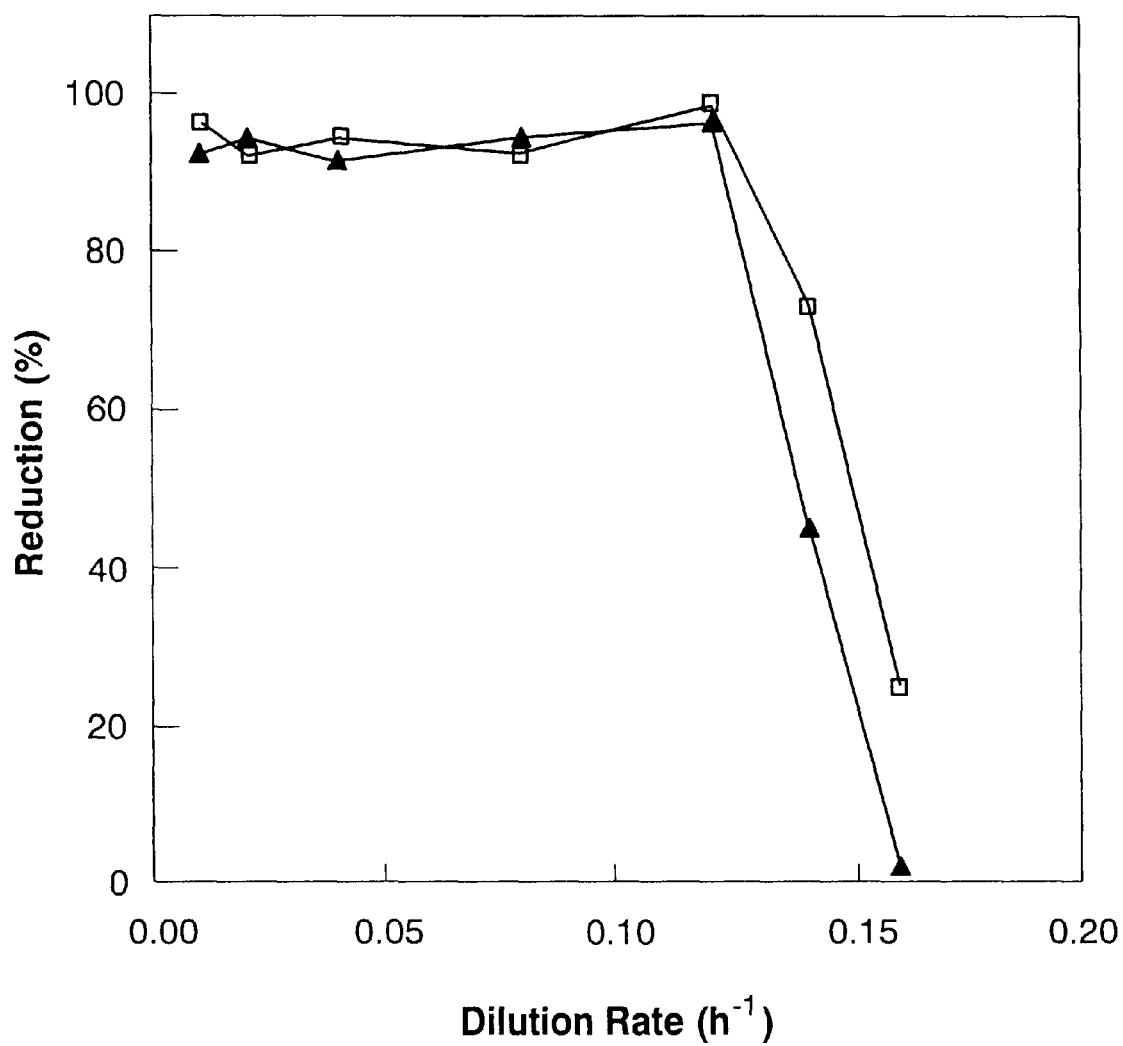
FIG. 5 shows the degradation of chlorate (□) and bromate (▲) at various dilution rates in a continuous culture.

1.13 Effect of Dilution Rate on the Degradation of Chlorate and Bromate in a Continuous Culture The degradation of chlorate and bromate was followed by the formation of chloride and bromide, respectively, in the continuous culture at various dilution rates. Initially a dilution rate of $0.02\ h^{-1}$ was maintained and the rate was increased stepwise by increasing the flow rate of the influent. Almost complete reduction of chlorate (12 mM) and bromate (1.2 mM) was observed at dilution rates up to $0.12\ h^{-1}$ (FIG. 5). Biomass wash-out was detected at a dilution rate of $0.20\ h^{-1}$ and as a consequence a rapid decrease in the degradation of both bromate and chlorate was noticed.

Discussion of FIGS. 1–5

The results demonstrate that anaerobic removal of chlorate from industrial effluents is feasible. The experiments describe such complete removal of chlorate taking place in an anaerobic reactor using acetate as sole source of carbon and energy. The results also demonstrate that the use of chlorate-reducing micro-organisms to reduce bromate is superior to the use of denitrifying micro-organisms.

FIG. 1 shows that chlorate-grown micro-organisms completely reduced the chlorate to chloride with acetate as sole source of carbon and energy, while the bromate was reduced by approximately 60% within the same period of time. The limited degradation of the bromate is probably due to halo-oxo acids competing for the available enzymes. The bromate was also reduced by a cell suspension in the absence of chlorate (FIG. 3). This means that bromate reduction is possible when chlorate is not directly available. As shown in FIG. 2, no reduction of chlorate or bromate was observed when acetate was excluded. This clearly demonstrates that the mixed culture uses acetate as electron donor. From the results it can be concluded that the bromate is co-metabolically reduced by chlorate-reducing bacteria, which use acetate as the source of carbon and reducing equivalents.

The continuous culture experiment revealed that a stable mixed culture of chlorate-reducing micro-organisms is capable of the complete reduction of both chlorate and bromate (9 mM chlorate and 1.2 mM bromate) up to a dilution rate of 0.12 h$^{-1}$. The stoichiometric formation of bromide and chloride demonstrated that there was no accumulation of intermediates. The maximum growth rate (0.42 h$^{-1}$) obtained in a batch culture with chlorate as sole electron acceptor is much higher than the growth rate obtained in the reactor system fed with both chlorate and bromate (0.12 h$^{-1}$).

This phenomenon is probably due to the presence of bromate in the reactor, which appeared to be toxic to the mixed culture at low concentrations (FIG. 4).

The objective of a second study was to investigate the removal of chlorate and bromate in a continuous process using a suspended carrier reactor, and to determine optimum process parameters (e.g. carrier material, carbon source, HRT, pH).

For the removal of chlorate from industrial effluents several types of reactors were investigated including bioreactors (with immobilised cells). This technology involved the colonisation of specialised micro-organisms onto biocarriers as fixed films, and the use of these carriers in bioreactors. These types of reactors offer several advantages over conventional bioreactors, for example, higher hydraulic loads, reduced sludge production, and high stability to process fluctuations. In this investigation a suspended carrier reactor was tested, in which the carrier material was mixed by means of mechanical stirring.

2. Materials and Methods

2.1 Chemicals

Sodium chlorate was purchased from Fluka Chemie, Bornem, Germany. Potassium bromide was purchased from J. T. Baker, Deventer, The Netherlands. All other chemicals were obtained from Janssen Chimica, Beerse, Belgium.

2.2 Carrier Materials

Polyurethane (PUR) foam (cubes of 10×10 mm) were obtained from Tauw Milieu, Deventer, The Netherlands. Polyethylene (PE) and polypropylene (PP) granulate (Ø5 mm) was obtained from Akzo Nobel Fibers, Arnhem, The Netherlands. Pumice (Ø0.2–0.5 mm, 2900 kg/M$^3$) was purchased from Aquatechniek, Papendrecht, The Netherlands, and silicone tubing (5×2 mm) was obtained from Meyvis-Co, Bergen op Zoom, The Netherlands.

2.3 Mineral Salts Medium

The mineral salts medium used contained the following minerals (per litre deionised water): 0.10 g $MgSO_4.7H_2O$; 0.50 g $(NH_4)_2HPO_4$; 3.10 g $K_2HPO_4$; 1.70 g $NaH_2PO_4$; 1.7 mg $Na_2SeO_3$; 0.1 ml trace element solution. Acetate was used as the sole source of carbon and energy, and chlorate as the electron acceptor. The pH of the solution was 7.2.

2.4 Inoculum

The inocula used in the experiments were obtained from an enrichment culture (grown as chlorate and acetate).

2.5 Waste Water Composition

The waste water used in the experiments originated from an incinerator. The waste water contained high concentrations of chlorate (1610 mg/l), bromate (750 mg/l), and salt.

2.6 Suspended Carrier Reactor

Figure 6:
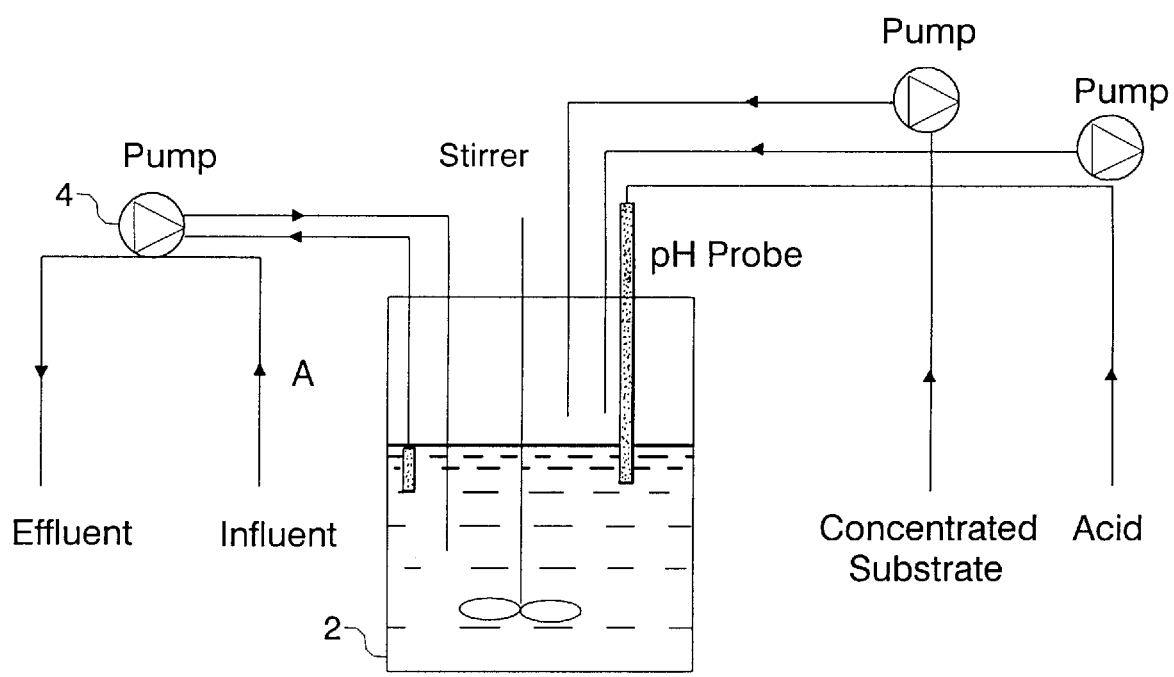
FIG. 6 shows in schematic outline a suspended carrier reactor system utilized for investigating the microbial reduction of chlorate and bromate.

The suspended carrier reactor is presented in FIG. 6. The reactor 2 (Applikon, Schiedam, The Netherlands) consisted of a 3-litre glass vessel temperature controlled at 30° C. by a heating coil. The reactor was closed by a steel cover. The pH was controlled at 7.2 using 10% phosphoric acid and a pH electrode connected to a pH controller (Applikon Schiedam, The Netherlands). The influent (stream A) (mineral salts medium supplied with chlorate and bromate) was pumped into the reactor 2 by a peristaltic pump 4 (Meyvis, Bergen op Zoom, The Netherlands). Mixing in the reactor was by mechanical stirring. The culture was made anoxic by nitrogen flushing for approximately 15 minutes, before each start-up. A concentrated acetate was pumped into the reactor by means of a peristaltic pump.

2.7 Operation of Bioreactor Using Various Carrier Materials

The reactor 2 was filled with the carrier material (approximately 1 litre for PUR and 200 ml for the other carriers) before each start-up. The influent (stream A) concentrations for chlorate, bromate, and acetate were 10 mM, 1.2 mM, and 24 mM, respectively. The dilution rate was initially set at 0.05 h$^{-1}$ and was increased stepwise to 0.4 h$^{-1}$ for each carrier reactor. At each dilution rate one to two weeks of adaptation was attained before the chloride and the bromide were determined in the effluent. After each experiment the carrier material was examined microscopically (40×magnification) for biofilm formation. The degradation efficiency was initially based on the formation of chloride.

2.8 Operation of Suspended Carrier Reactor at High Influent Concentrations

A bioreactor with polypropylene as carrier material was operated at a low dilution rate of 0.05 h$^{-1}$. The influent concentration of chlorate was 38 mM during the entire experiment and the bromate concentration was gradually increased to a final concentration of 5 mM. The carbon and energy source in the influent (acetate) was maintained at a concentration level of 1.5 times the total concentration of both chlorate and bromate at all times. The degradation rate of chlorate and bromate was determined by measuring the formation of chloride and bromide, respectively.

2.9 Growth Experiments with Various Carbon Sources

Growth of the mixed culture with different carbon and energy sources was determined in 100 ml serum bottles with gas-tight caps filled up to 75% of their volume with mineral salts medium and 24 mM of the substrate and incubated at 30° C. Chlorate was added at a concentration of 10 mM. Growth was followed by determination of the turbidity (visually). The cultures were made anoxic by being flushed with nitrogen gas for approximately 5 minutes.

Growth was followed for a maximum period of 2 months.

2.10 Degradation of Chlorate and Bromate in Waste Water Samples

The degradation of the chlorate and bromate present in the waste water samples of an incinerator was tested in 100 ml serum bottles filled with waste water (or diluted wastewater) up to 75% of their volume, flushed with nitrogen, and closed with gas-tight caps. Synthetic seawater (Instant Ocean, Aquarium Systems, Sarrebourg, France) was used for dilution of the samples, and minerals were added to some of the vessels. Degradation was followed by measuring the decrease in the concentration of both chlorate and bromate. The waste water was incubated for approximately 4 weeks at 30° C. Prior to inoculation active chlorine was removed by treatment with sodium sulfite (20 mg/l).

2.11 pH and Temperature Effect on Degradation Efficiency

The effect of the pH on the activity of the mixed culture was checked in the bioreactor at a dilution rate of 0.1 $h^{-1}$ and an influent concentration of chlorate and bromate of 10 mM and 1.2 mM, respectively. The pH was varied from 6 to 10 using 1 M sodium hydroxide or 10% phosphoric acid. At each pH the bioreactor was operated for approximately 1 week before the chloride and bromide concentrations were determined in the effluent. The temperature effect was tested separately in the bioreactor. The temperature was raised from 20 to 45° C. with intervals of 5° C. After each alteration the mixed culture in the reactor was stabilised for two to five days and subsequently the chloride or bromide was measured.

2.12 Analytical Procedures

Chloride was analysed by means of volumetric precipitation with silver nitrate. The equivalence point of the titration was determined potentiometrically using a titroprocessor model 672 and a dosimat 655 (Methrom AG, Herisau, Switzerland). The bromide was determined by the standard addition method using a solid state bromide electrode (model 94-35, Orion Research, Cambridge, USA) coupled to an mV meter (Consort P207, Salm-Kipp bv, Breukelen, The Netherlands).

The non-purgeable organic carbon (NPOC) was determined using a TOC apparatus (Dohrmann DC-190, Rosemount Analytical Inc. Santa-Clara, USA). Micro-organisms were removed by centrifugation (10 min, 10,000 g), and the samples were acidified to enable the removal of carbon dioxide by purging with oxygen prior to injection into the apparatus.

The bromate and chlorate were determined using a capillary zone electrophoresis (CZE) apparatus (Prince, Lauerlabs, Emmen, The Netherlands). The CZE apparatus had a fused silica column (ID 50 mm, length 725 mm) and was equipped with a UV absorbance detector (Applied Biosystems 759 A, Foster City, USA) at 250 nm. The voltage setting for the electrophoresis was −30 kV in a buffer consisting of a mixture of pyromellitic acid, 2.3 mM, sodium hydroxide, 3.3 mM, and hexamethonium hydroxide, 11 mM, at pH=4.7. The hydrodynamic injection conditions were 0.2 min at 30 mbar.

2.13 Methods and Materials of Phylogenetic Analysis of Strain GR-1

Genomic DNA extraction, PCR mediated amplification of the 16S rDNA and purification of PCR products was carried out as described in Rainey, F. A., M.

Dorsch, H. W. Morgan and E. Stackebrandt. 1992. 16S rDNA analysis of Spirochaeta thermophila: position and implications for the systematics of the order Spirochaetales. System. Appl. Microbiol. 16: 224–226; and Rainey, F. A., and E. Stackebrandt. 1993. 16S rDNA analysis reveals phylogenetic diversity among the polysaccharolytic clostridia. FEMS Microbiology Letters 113: 125–128. Purified PCR products were sequenced using the Taq Dye-Deoxy TM Terminator Cycle Sequencing Kit (Applied Biosystems, Germany) as directed in the manufacturer's protocol. Sequence reactions were electrophoresed using the Applied Biosystems 373 DNA Sequencer. The 16S rDNA sequence was manually aligned against representative sequences of members of the beta subclass of the proteobacteria.

Pairwise evolutionary distances were computed using the correction of Jukes, T. H., and C. R. Cantor. 1969. Evolution of protein molecules. In: Munro, H. N. (ed.), Mammalian Protein Metabolism, pp. 21–132. Academic Press, New York, N.Y. The least squares distance method of DeSoete, G. 1983. A least squares algorithm for fitting additive trees to proximity data. Psychometrika, 48:621–626, was used in the construction of the phylogenetic dendrogram from distance matrices.

Results and discussion

2.14 Effects of Dilution Rate on Biofilm Formation

Figure 7:
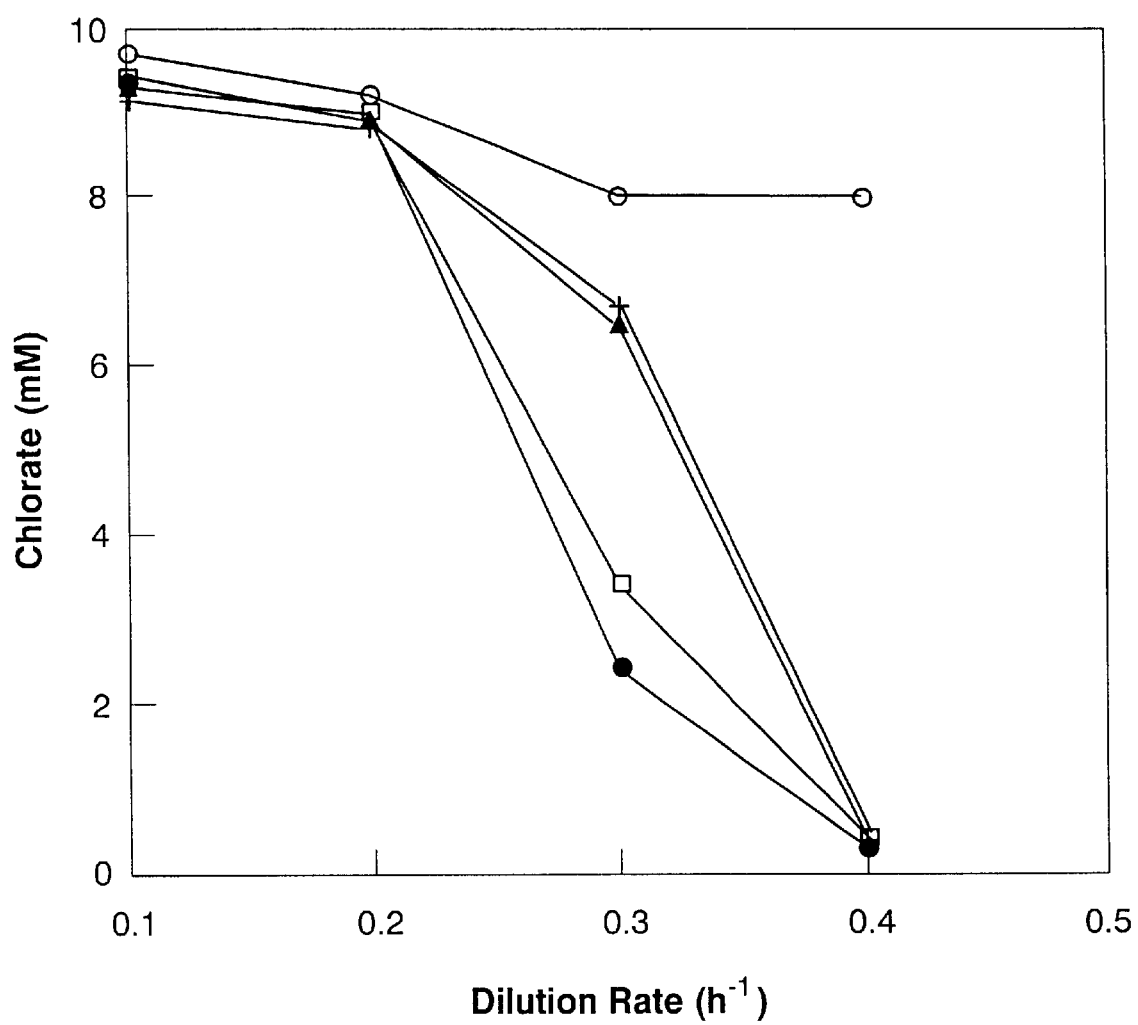
FIG. 7 shows the reduction of chlorate (10 mM) in a suspended carrier reactor with several carriers: ○=polyurethane, ▲=polypropylene, □=polyethylene, ●=pumice, +=silicone.

A total of 5 carrier materials with different compositions were tested. After each adaptation period (>95% removal) the dilution rate was increased up to a final rate of 0.4 $h^{-1}$. The results are presented in FIG. 7. The removal of chlorate was assessed by the formation of chloride. At low dilution rates (0.05–0.2 $h^{-1}$) complete removal of chlorate was observed. Microscopic examination of the materials showed that minor colonisation of the carrier materials had occurred. At higher dilution rates (0.3–0.4 $h^{-1}$) the degradation percentages dropped below 10% for all carrier materials except PUR. At a dilution rate of 0.4 $h^{-1}$ colonisation of the carrier material was clearly visible in the bioreactor with PUR (Table 1).

TABLE 1

Biofilm formation on carrier material after 2 months of operation

| Carrier material | Biofilm formation |
|---|---|
| polyurethane | ++[1] |
| polypropylene | − |
| polyethylene | − |
| pumice | + |
| silicone | − |

[1] = Biofilm was not attached on PUR but accumulated in the pores on the cubes
+ = Biomass formation (40 × magnification)
++ = Extensive biomass formation
− = No biomass attachment visible

Figure 8:
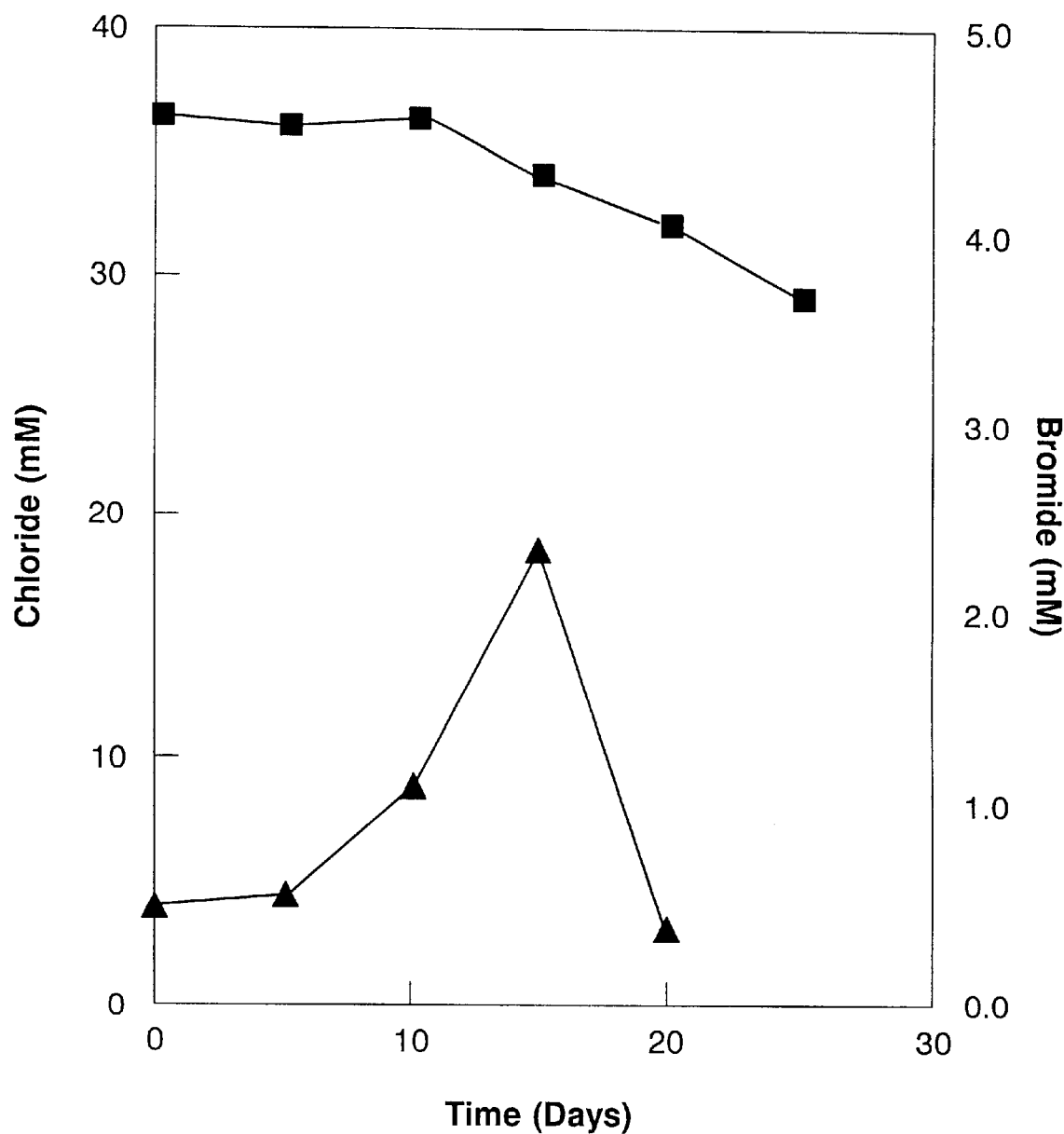
FIG. 8 shows the degradation of chlorate (■, 38 mM) and bromate (▲) with increasing bromate concentration in the suspended carrier reactor (on days 5, 10, and 15 the bromate concentration was increased to 1.2, 2.4, and 4.8 mM, respectively)

2.15 Microbial Adaptation to High Concentrations of Chlorate and Bromate results of the adaptation experiments are presented in FIG. 8. The experiments were performed using a chlorate concentration in the influent of 38 mM during the entire experiment, and were started up with a bromate concentration of 0.6 mM. From the results it is evident that at 2.4 mM bromate or higher the toxicity of bromate to the mixed culture influences the degradation process. As a result the degradation of bromate decreased rapidly, while the chlorate degradation was affected to a lesser extent. The toxicity data of bromate obtained with unacclimatised chlorate-grown micro-organisms showed that toxic effects already occurred at concentrations of approximately 1.2 mM. It is clear that the culture has adapted to higher bromate concentrations during this experiment. The decreased toxicity of bromate is probably the result of the selection of other micro-organisms and acclimatisation to bromate. The adaptation of the culture to higher concentrations of bromate is a time dependent process and probably does not stop at the level of 2.4 mM found in this experiment. Because the bromate is co-metabolically reduced and cannot be used as the sole electron acceptor by the mixed culture, an excess amount of chlorate should be available. However, it has been shown that the chlorate-grown micro-organisms can reduce bromate for several hours at a relatively high rate (0.3 mmol $h^{-1}$ g protein$^{-1}$) without the presence of chlorate in the medium. This finding indicates that fluctuations of the chlorate/bromate ratio in the waste water do not necessarily affect the degradation of bromate instantaneously.

2.16 Utilisation of Various Carbon Sources

The mixed culture can utilise dicarboxylic acids, alcohols, amino acids, and carbohydrates, as shown in Table 2.

TABLE 2

Utilisation of various carbon sources by the mixed culture

| Carbon source | Growth |
|---|---|
| acetate | ++ |
| propionate | ++ |
| ethanol | ++ |
| methanol | − |
| succinate | ++ |
| malate | ++ |
| lactate | + |
| formate | − |
| glucose | +/− |
| glycine | +/− |

+ = Growth (based on turbidity of culture)
++ = Extensive growth
+/− = Slight increase in turbidity Growth was observed within several days with ethanol, succinate, malate, lactate, and the fatty acids acetate and propionate. The mixed culture lacks the ability to make substantial use of methanol, formate, glycine or glucose, as indicated by the minimal increase in turbidity after 2 months of incubation. It is obvious that the mixed culture is capable of degrading fatty acids and carboxylic acids with 2–4 carbon atoms, which is in agreement with the results found in an investigation where the chlorate reduction in batch cultures using various inocula was demonstrated. C1-compounds were not utilised, which indicates that the micro-organisms cannot change to the metabolic pathway for C1-assimilation.

2.17 Reduction of Chlorate and Bromate in Waste Water Samples

The reduction of chlorate and bromate in the effluent of an incinerator was tested in batch cultures. The chloride and bromide formation in these cultures could not be determined because of the high salt concentration (2.5 %) of the waste water. Therefore, the degradation of chlorate and bromate was followed by a determination of the actual chlorate and bromate levels in the waste water samples using capillary zone electrophoresis. Because the waste water contained residues of active chlorine (1 mg/l) the samples were pretreated with sodium sulfite (20 mg/l) for several hours prior to inoculation with the mixed culture. As shown in Table 3, complete chlorate and bromate reduction was achieved in the 1:1 dilution with minerals after an incubation period of 14 days, but the same sample without additional minerals did not reduce the chlorate and bromate completely, which indicates that the waste water must be supplemented with additional minerals for efficient chlorate and bromate removal. The untreated (no sodium sulfite) samples (diluted or not) did not reduce any chlorate, due to the toxic effect of the chlorine present in the waste water. It was also apparent that the undiluted sample which was treated with sodium sulfite did not reduce any chlorate or bromate, which was probably because of the high concentration of bromate (13 mM) in the waste water. Bromate is toxic to the mixed culture. Based on these results it can be stated that the high salt concentration of the effluent from an incinerator is not toxic to the mixed culture, and that the reduction of both chlorate and bromate is feasible, provided that active chlorine is absent or removed. The active chlorine, which is highly toxic to micro-organisms, must be removed from the waste water, e.g., by chemical reduction, before it is treated in the biological reactor.

TABLE 3

| Sample | Chlorate (mM) (days) | | Bromate (mM) (days) | |
|---|---|---|---|---|
| | t = 0 | t = 14 | t = 0 | t = 14 |
| effluent | 14.4 | 13.2 | 3.1 | 2.7 |
| effluent + 20 mg/l Na$_2$SO3 | 14.2 | 13.6 | 3.2 | 2.9 |
| effluent, diluted 1:1 | 14.0$^1$ | 13.2 | 1.8 | 1.6 |
| effluent + 20 mg/l Na$_2$SO$_3$ diluted 1:1 | 13.3$^1$ | 0.2 | 1.9 | <0.1 |
| effluent + 10 mg/l Na$_2$SO$_3$ diluted 1:1 without minerals | 13.1$^1$ | 6.6 | 1.6 | 0.8 |

2.18 pH and Temperature Effect on Removal Efficiency

Operation of the bioreactor at a high pH and high temperature is interesting from an economic point of view. Hydrochloric acid, which is necessary for pH control, would account for a considerable part of the variable costs, since the waste water, which is highly alkaline, must be neutralised for optimal biological reduction of both chlorate and bromate. Operation of the biological reactor at high temperatures is sometimes desirable, since the energy consumption of the heat exchanger (cooling of effluents) will decrease with an increasing biological process temperature.

Figure 9:
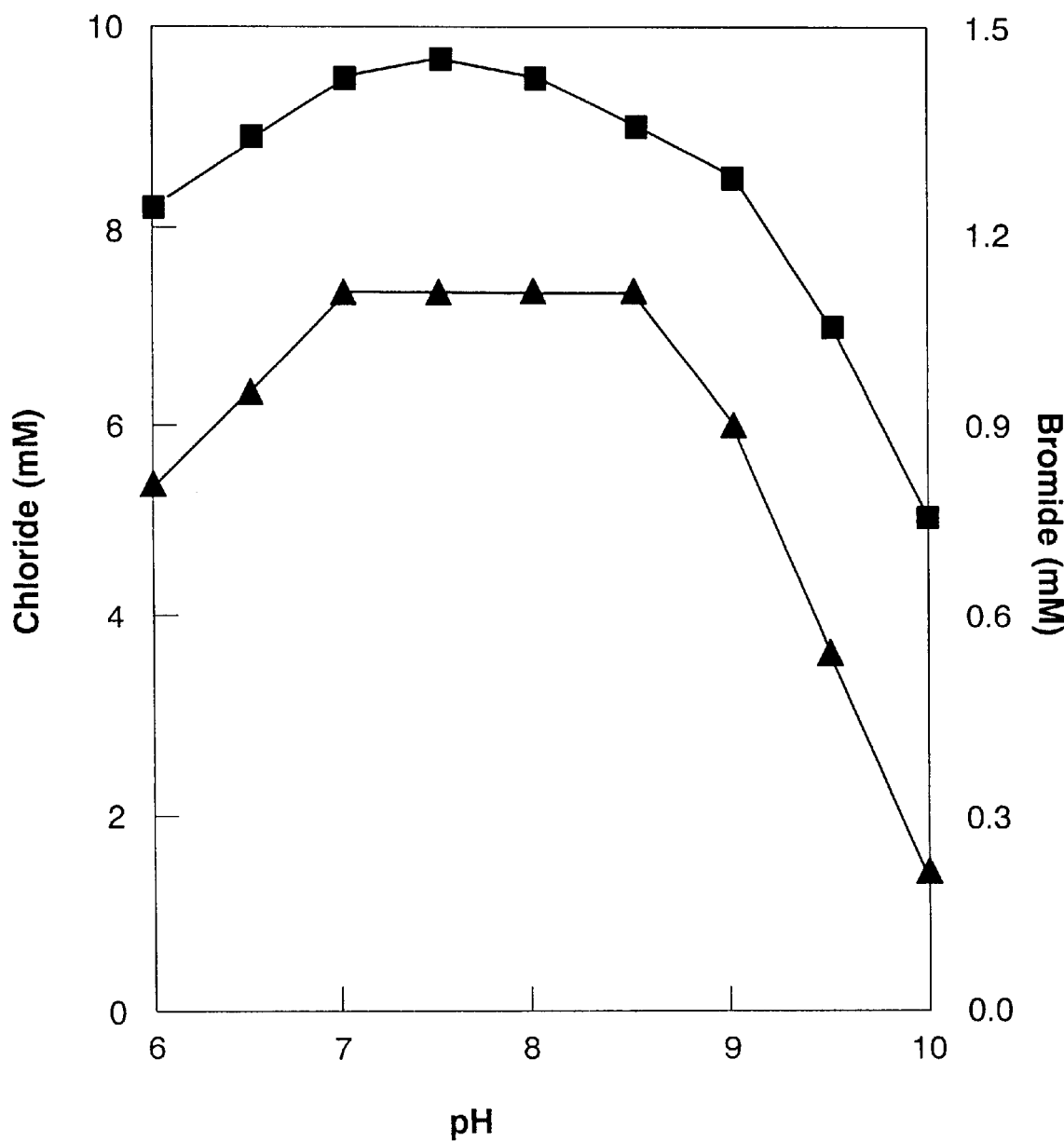
FIG. 9 shows the effect of pH on chlorate (■, 10 mM) and bromate (▲, 1.2 mM) reduction in the suspended carrier reactor.
Figure 10:
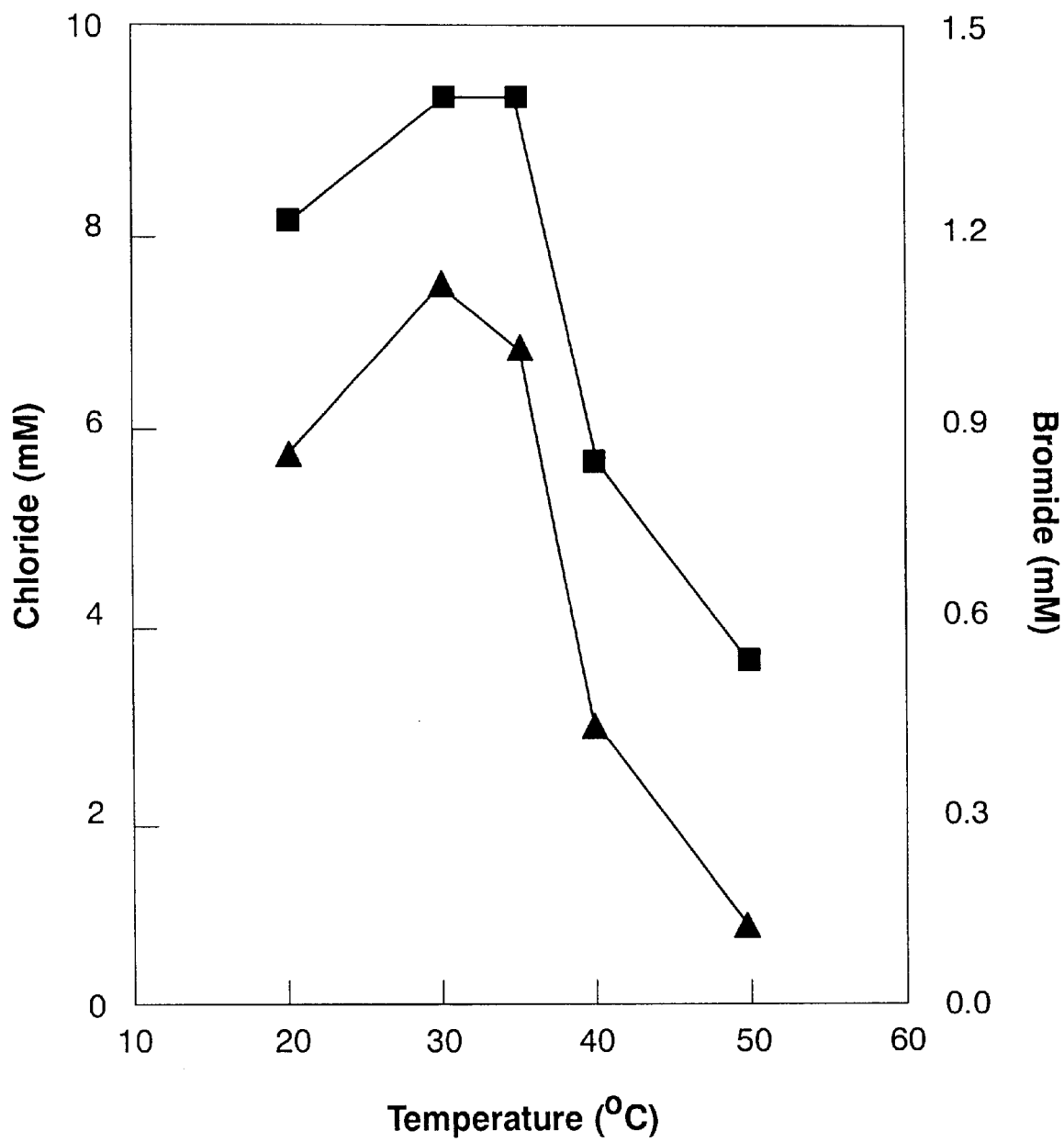
FIG. 10 shows the effect of temperature on chlorate (■, 10 mM) and bromate (▲, 1.2 mM) reduction in the suspended carrier reactor.

Chlorate and bromate reduction occurred in the pH range of 6–10. The optimum pH for chlorate reduction is 7.5, as shown in FIG. 9. A reduction of both chlorate and bromate of 80% was found at a pH level of 9.0. This indicates that operation of the bioreactor at higher pH levels may be feasible. The reduction of the bromate was significantly inhibited at a pH of 9.5 or higher, but the chlorate reduction was affected to a lesser extent. The temperature optimum was determined at 30–35° C., as indicated in FIG. 10.

The chlorate and bromate reduction was inhibited almost completely at temperatures above 40° C., which is probably due to inactivation of the enzymes involved in the reduction of chlorate.

2.19 Conclusions:

It can be concluded that the biological removal of chlorate and bromate from industrial effluents is feasible. The reduction of both chlorate and bromate was achieved at the expense of various carbon sources (e.g. ethanol). The culture was able to adapt to high concentrations of both chlorate (38 mM) and bromate (5 mM). The optimum pH and temperature ranges for the reduction of chlorate and bromate are between 7.5–8.5 and 30–35° C., respectively.

3. A Third Series of Experiments was Carried out to Investigate the Removal of Bromate From Potable Water by Chlorate-reducing Micro-organisms.

OBJECTIVE

To determine the feasibility of bromate reduction at low levels by chlorate-reducing micro-organisms.

To assess the reduction rates, stability, and process parameters for bromate removal using a membrane bioreactor.

To determine the kinetic parameters for bromate reduction.

SUMMARY

Bromate removal from potable water using chlorate-reducing micro-organisms (strain GR-1) was investigated in both batch and continuous cultures. Strain GR-1 precultivated with chlorate as the sole electron acceptor was capable of bromate reduction without the presence of chlorate in a batch culture. Bromate removal in a membrane bioreactor (MBR) was feasible but did not reach the level necessary for drinking water applications, because of the instability of the GR-1 cells in the membrane bioreactor. The $K_m$ calculated was 3.2 mg/l The $V_{max}$ derived from the same experiments was 4.3 µg/min·mg protein. Degradation of bromate down to a level of 10 µg/l was observed in batch experiments, but the reduction rate dropped to approximately 10% of the maximum value.

CONCLUSIONS

The results of the batch experiments have shown that co-metabolic reduction of bromate by chlorate-reducing micro-organisms is feasible. Chlorate-grown cells were capable of reducing bromate without additional chlorate as electron acceptor source. The initial reduction rates of the bromate were even higher without additional chlorate in the batch experiments. Therefore, the removal of bromate from potable water using GR-1 is feasible, but the removal rate will decrease at very low concentrations of bromate.

EXPERIMENTAL 3.1 Chemicals

Sodium chlorate was purchased from Fluka Chemie (Bornem, Germany). Potassium bromide and potassium bromate were obtained from J. T. Baker (Deventer, The Netherlands). All other chemicals were supplied by Acros Organics (Geel, Belgium).

3.2 Growth Medium

The mineral salts medium used contained the following minerals (per litre deionised water): 0.10 g $MgSO_4.7H_2O$; 0.50 g $(NH_4)_2HPO_4$; 3.10 g $K_2HPO_4$; 1.70 g $NaH_2PO_4$; 1.7 mg $Na_2SeO_3$; 0.1 ml trace element solution (Vishniac, W., Santer, M. (1957) The Thiobacilli. Bacteriological Reviews 21, 159–231). Acetate was used as the sole source of carbon and energy, and chlorate as electron acceptor. The pH of the solution was 7.2.

3.3 Cultivation of Chlorate-Reducing Micro-Organisms

The continuous culture (Applikon, Schiedam, The Netherlands) was inoculated with strain GR-1 (Rikken, G. B., Kroon, A. G. M., van Ginkel, C. G. (1996) Transformation of (per)chlorate into chloride by a newly isolated bacterium: reduction and dismutation. Applied Microbiology and Biotechnology 45, 420–426). After growth was initiated, a continuous flow of mineral medium (acetate 2 g/l, chlorate 1 g/l) was started, and a dilution rate of 0.02 $h^{-1}$ was attained. The pH was set at 7.5 and controlled by automatic titration using 1 M phosphoric acid (10% v/v). The temperature was maintained at 30° C. using a water jacket. The continuous culture was flushed with nitrogen to maintain anaerobic conditions.

3.4 Washed Cell Suspensions

The washed cell suspension was prepared by centrifugation of chlorate-grown cells from the continuous culture (500 ml) at 10,000 g for 15 min at 4° C. The resulting pellet was washed twice with phosphate buffer (124 mM) and resuspended in the same buffer (100 ml) after the final centrifugation step. This suspension was kept at 4° C. until use.

3.5 Membrane Bioreactor

Figure 11:
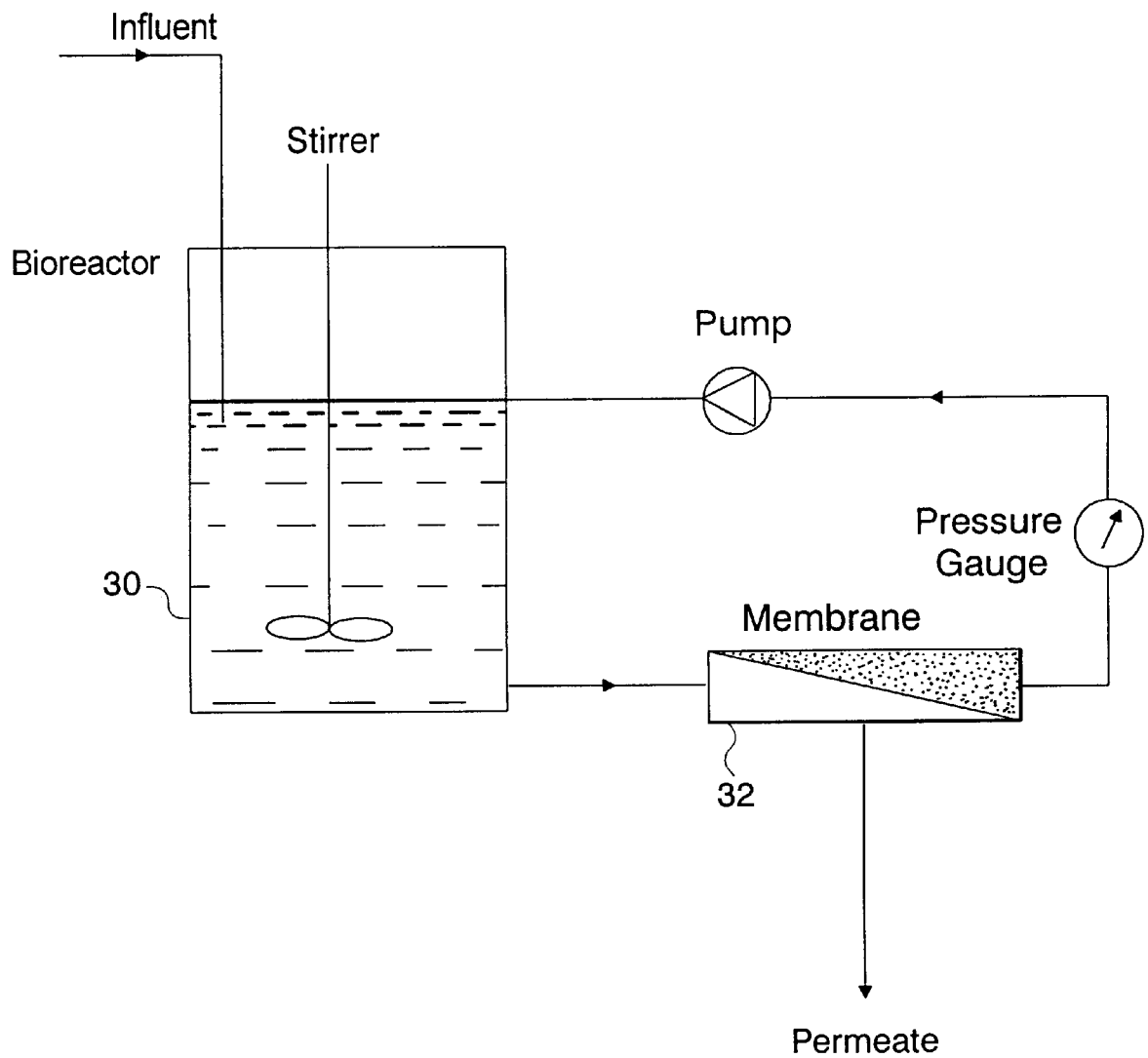
FIG. 11 is a schematic diagram of a membrane bioreactor utilized in investigating the removal of bromate from potable water by chlorate-reducing micro-organisms.

A membrane bioreactor 32 (FIG. 11) consisted of a cross-flow membrane (CFCC, Le Carbone-Lorraine, France) with a pore diameter of 0.05 µm and a specific surface area of 75 $cm^2$, and was connected to the bioreactor (1.5 l) 30 by a suction pump (15 l/min, Iwaki, Tokyo, Japan). The reactor was kept at 30° C. using a heating coil, and the pH was maintained at 7.2 using a pH electrode coupled to a pH-controller (ADI 1020, Applikon, Schiedam, The Netherlands). The membrane pressure was controlled at approximately $5 \cdot 10^4$ Pa to keep a constant flow rate. The bioreactor was continuously flushed with nitrogen, to maintain anaerobic conditions. Drinking water spiked with bromate was fed into the reactor using a peristaltic pump (Gilson Minipuls 3, Meyvis & Co., Bergen op Zoom, The Netherlands). The reactor was inoculated with a washed cell suspension of chlorate-grown cells.

3.6 Determination of the Kinetic Parameters

The kinetic parameters were determined by measuring initial degradation rates at various bromate concentrations. The degradation rates were determined by measuring the formation of bromide. The degradation rates were determined in vessels containing 40 ml of a washed cell suspension at 30° C. The cell suspensions contained 1 g/l acetate and were continuously flushed with nitrogen to maintain anaerobic conditions. The degradation rates were calculated using the initial linear parts of the curves.

3.7 Analytical Methods

Chloride was analysed by means of volumetric precipitation with silver nitrate. The equivalence point of the titration was determined potentiometrically using a titroprocessor model 672 and a dosimat 655 (Methrom AG, Herisau, Switzerland). The bromide was determined by the standard addition method using a solid state bromide electrode (model 94-35, Orion Research, Cambridge, USA) coupled to an mV meter (Consort P207, Salm-Kipp bv, Breukelen, The Netherlands). Protein was determined by the bicichoninic acid method (Smith, P. K., Krohn, R. I., Hermanso, G. T., Mallia, A. K., Gartner, F. H., Provenzano, M. D., Fujimoto, E. K., Goeke, N. M., Olsen, B. J., Klenk, D. C. (1985) Measurement of protein using bicichoninic acid. Analytical Biochemistry 150, 76–85). The turbidity of the cultures was determined using a nephelometer (Hach, Ratio/XR, Loveland, USA) and expressed as Nephelometric Turbidity Units (NTU). The non-purgeable organic carbon (NPOC) was determined using a TOC apparatus (Dohrmann DC-190, Rosemount Analytical Inc. Santa-Clara, USA). Samples were acidified to enable the removal of carbon dioxide by purging with nitrogen prior to injection into the apparatus.

The bromate and chlorate were determined using a capillary zone electrophoresis apparatus (Prince, Lauerlabs, Emmen, The Netherlands). The CZE apparatus had a fused silica column (ID 50 mm, length 725 mm) and was equipped with a UV absorbance detector (Applied Biosystems 759 A, Foster City, USA) at 250 nm. The voltage setting for the electrophoresis was −30 kV in a buffer consisting of a mixture of pyromellitic acid, 2.3 mM, sodium hydroxide, 3.3 mM, and hexamethonium hydroxide, 1.3 mM, at pH=5. The hydrodynamic injection conditions were 0.2 min at 30 mbar. The bromate concentrations at very low levels (<1 mg/l) were determined by ion chromatography (Dionex DX-120) using (suppressed) conductivity detection. The column used was an lonpac AS-9-HC+AG9-HC. The eluent consisted of 9.0 mM $Na_2CO_3$ at a rate of 1 ml/min. The injection volume was 25 µl.

Results and Discussion 3.8 Co-metabolic Reduction of Bromate by Strain GR-1

Figure 12:
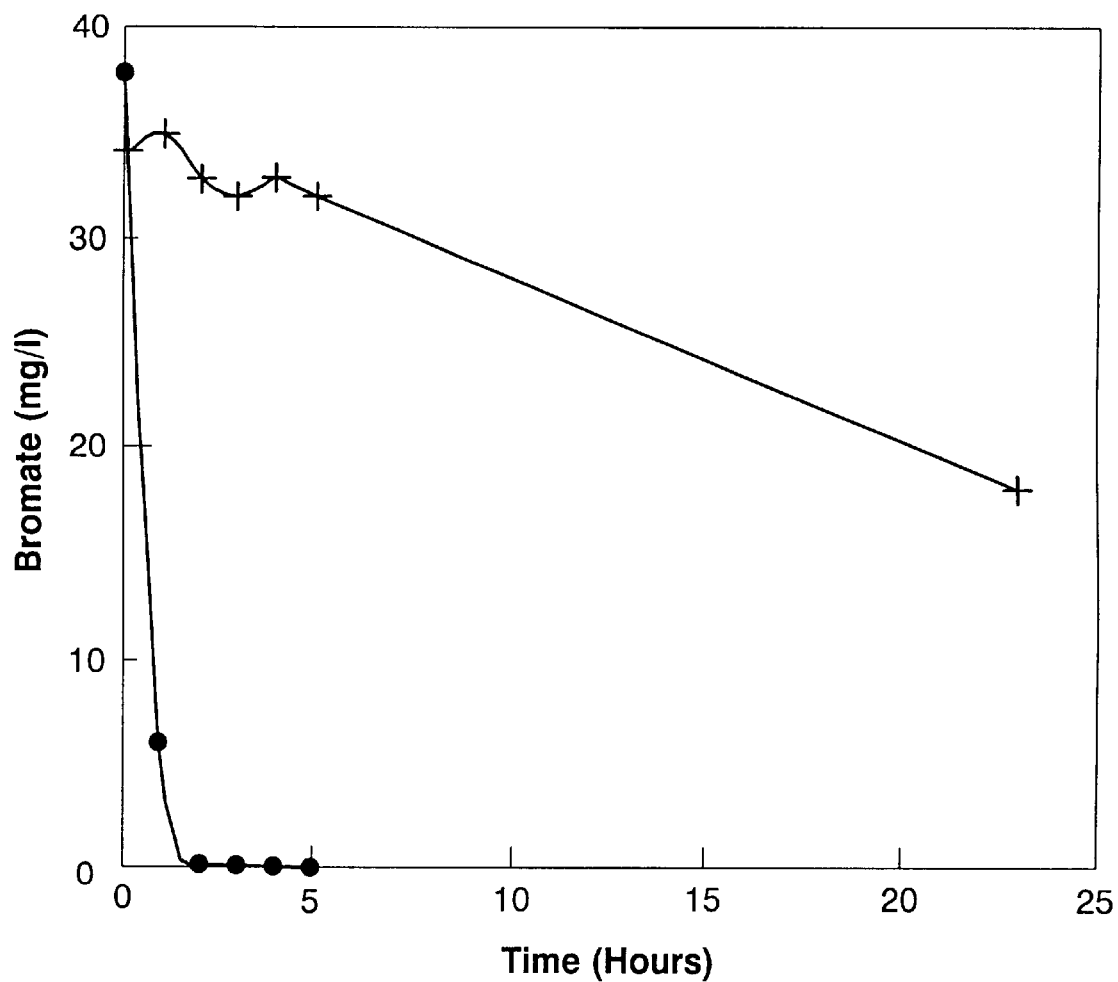
FIG. 12 shows the reduction of bromate by a washed cell suspension of chlorate-reducing micro-organisms, with (●) and without (+) the addition of acetate as sole source of energy.
Figure 13:
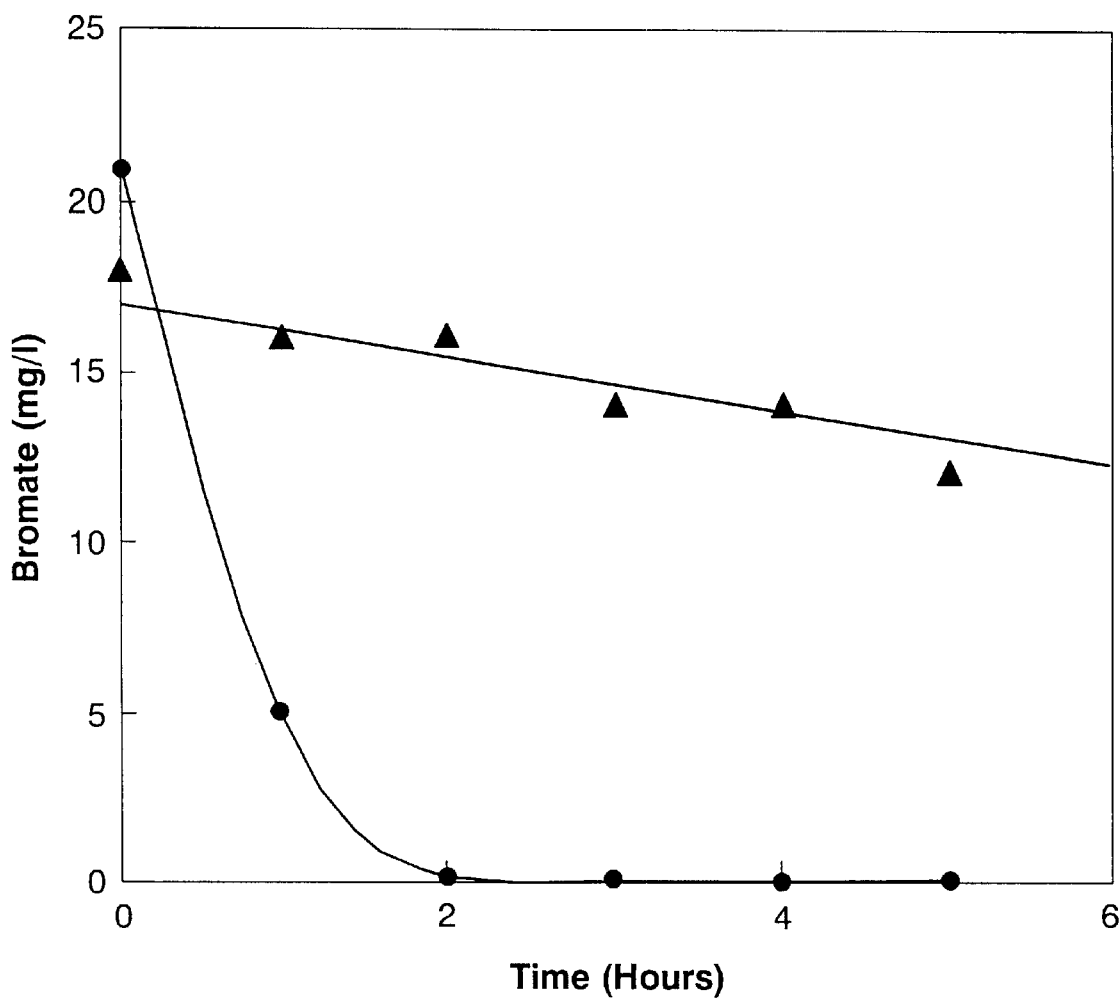
FIG. 13 shows the reduction of bromate by a washed cell suspension of chlorate-reducing micro-organisms in the absence (●) and the presence (▲) of chlorate. Acetate was added as reducing agent.

The chlorate-reducing bacteria (GR-1) were cultivated in a continuous culture, with an excess amount of acetate as the sole source of energy and carbon. After steady state conditions were reached (complete reduction of chlorate), cells were withdrawn from the reactor for use in the batch experiments. As shown in FIG. 12, the reduction of bromate was initiated immediately upon the addition of bromate to the vessel containing chlorate-grown cells. Complete reduction of 20 mg/l bromate was reached within 2 hours in the batch culture where acetate was added as the sole source of energy. The batch culture without additional acetate also reduced the bromate, but at a much lower rate. Bromate reduction without the addition of an external energy source indicates that these cells have an intracellular storage of reductant equivalents. It is obvious that the addition of an external energy source increases the reduction of bromate. The bromate reduction decreased rapidly whenever chlorate was added as (co)reductant in the batch experiments. As shown in FIG. 13, the bromate reduction was inhibited when an excess amount of chlorate was added. Approximately 40% of the bromate was reduced after an incubation period of 24 hours, while complete bromate reduction was reached within a few hours in cultures without chlorate. This means that the affinity of GR-1 cells for chlorate is much higher than for bromate.

3.9 Bromate Reduction by Chlorate-Reducing Cells in a Membrane Bioreactor

Figure 14:
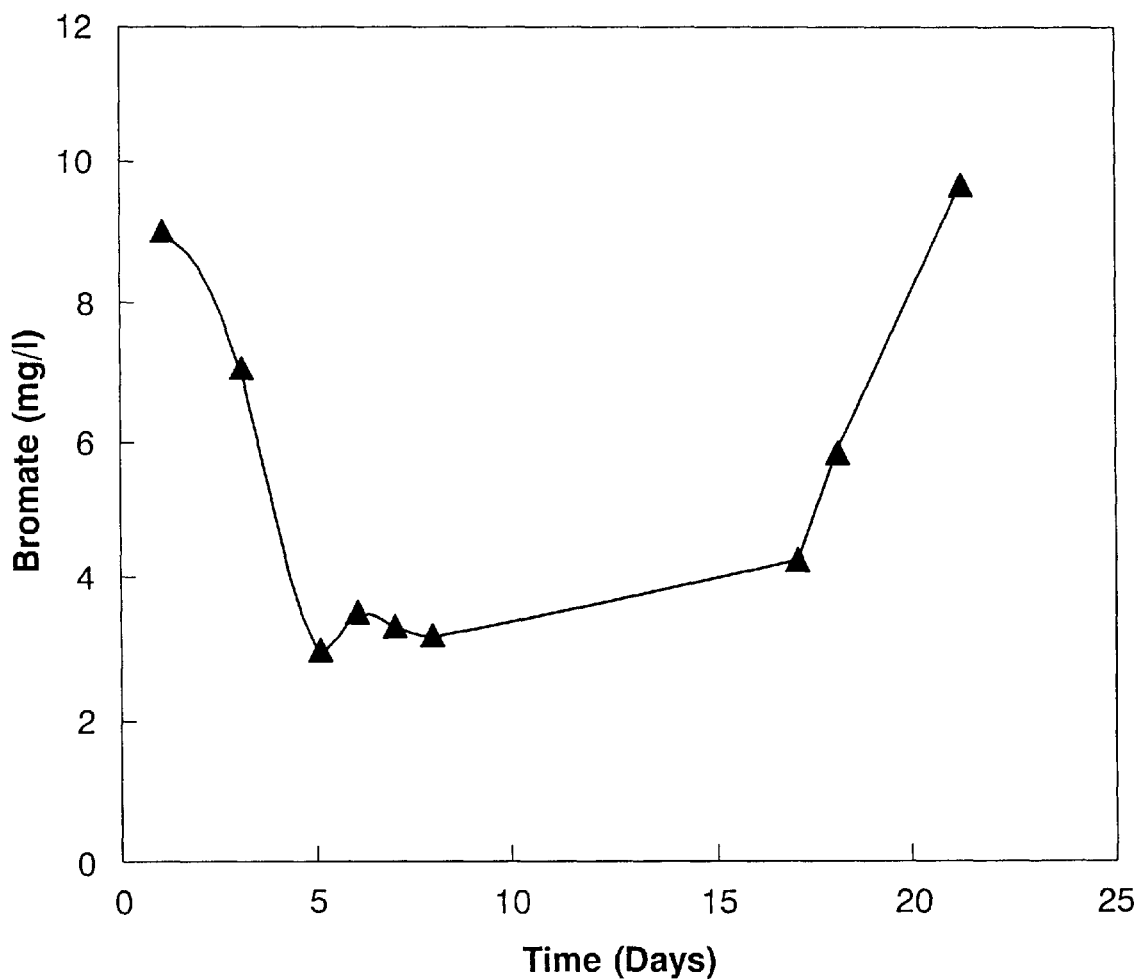
FIG. 14 shows the bromate content in the effluent of a membrane bioreactor (MBR) treating drinking water at an HRT of 12 hours. The influent concentration of bromate was 10 mg/l.

FIG. 14 shows the degradation of bromate in a membrane bioreactor during 3 weeks of operation. The hydraulic retention time of the reactor was set at 12 hours and the bromate concentration was followed over time. After 5 days a bromate level of 3 mg/l was achieved in the effluent of the MBR. Subsequently the concentration of bromate increased slowly, and after 17 days the bromate concentration in the effluent rapidly increased to the level of the influent, as shown in FIG. 14.

3.10 Estimation of the $K_m$ for Strain GR-1

Figure 15:
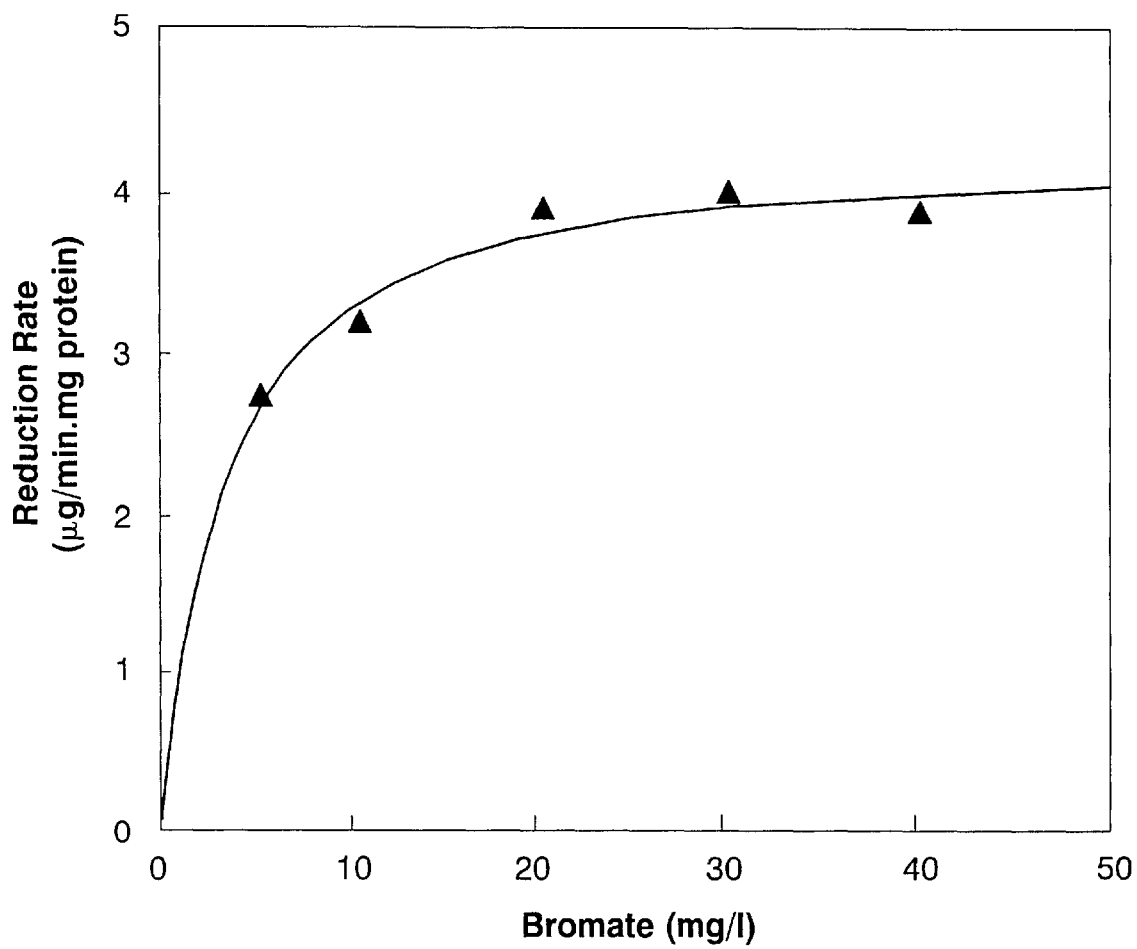
FIG. 15 shows the reduction of bromate (▲) by a washed cell suspension of chlorate-reducing micro-organisms at various bromate concentrations.

The kinetic parameter Km for strain GR-1 was estimated using reduction rates of bromate determined at various bromate concentrations. For the calculation of the degradation rates only the linear parts of the curves were used. These rates are plotted in FIG. 15. The maximum reduction rate ($V_{max}$) was derived from the curve based on the Monod equation (1-site ligand): $Y=V_{max} \cdot X/(K_m+X)$ Wherein y is the reduction rate ($\mu$g/min·mg protein), x is the concentration (mg/l), $K_m$ is the half saturation constant (mg/l), and $V_{max}$ the maximum reduction rate ($\mu$g/min·mg protein).

The $V_{max}$ found was 4.3 $\mu$g/min·mg protein. Assuming that 50% of the dry weight (DW) of microbial cells is protein, this equates to bromate reduction rate of 2150 $\mu$g/min·g DW, which is much higher than the rate as observed for denitrifying bacteria (reportedly ranging from 2 to 25 jig/min·g DW. At 5 mg/l the reduction rate dropped to 2.7 $\mu$g/min·mg protein, which means a decline of less than 50%. Measurements at lower concentrations were not possible due to the detection limit of the analytical method used. The $K_m$ derived from the Monod curve in FIG. 15 was 3.2 mg/l.

3.11 Conversion of Bromate Below the $K_m$

Figure 16:
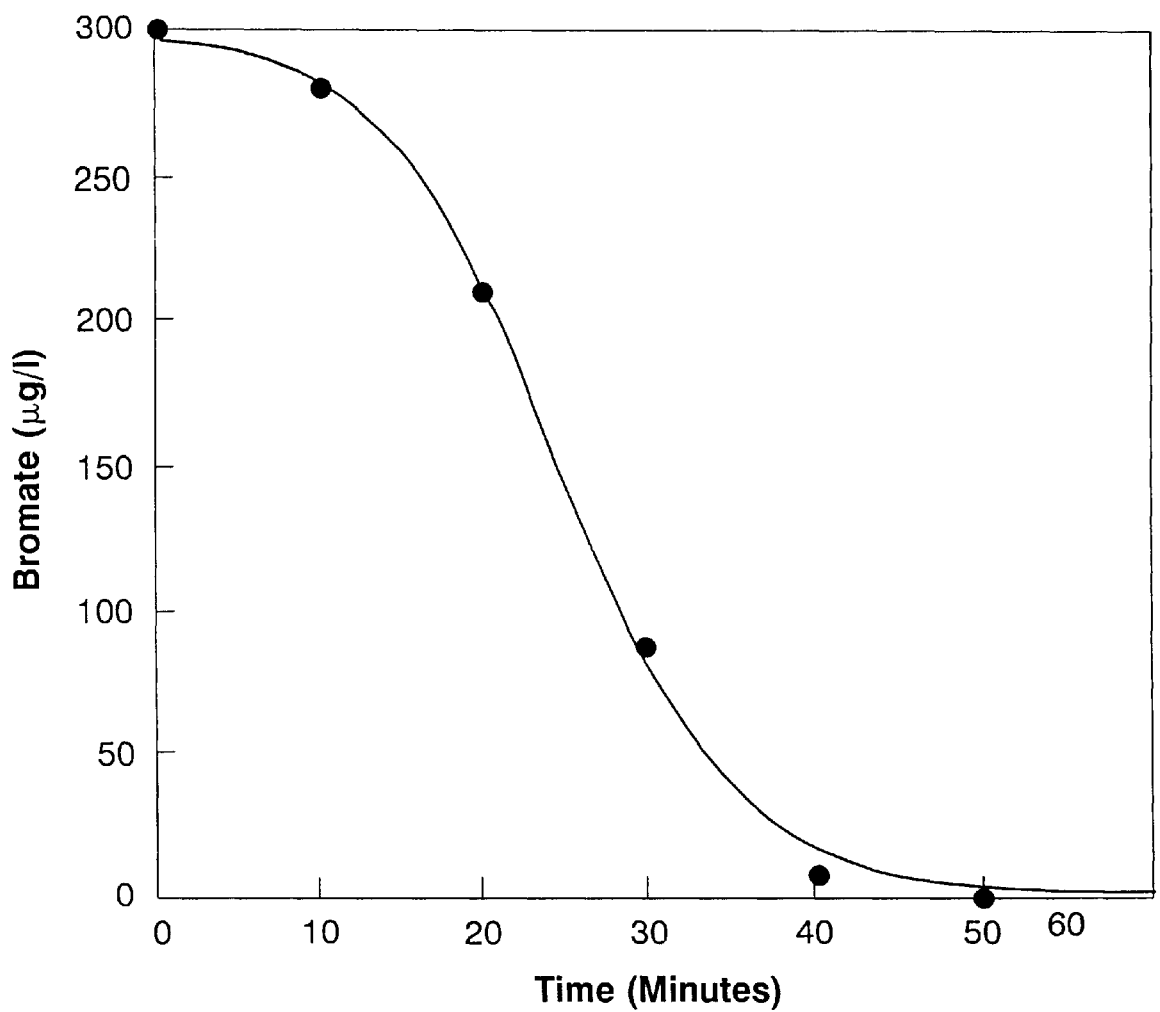
FIG. 16 shows the time course of bromate reduction by a washed cell suspension of chlorate-reducing micro-organisms at bromate concentrations below the $K_m$. (the bromate concentrations were determined using ion chromatography)

To assess the degradation at levels far below the $K_m$ a progression curve was made. Bromate depletion was measured using ion chromatography, which was applicable for measurements of both bromate and bromide at very low levels (<10 $\mu$g/l). The batch experiment was performed using a washed cell suspension grown with chlorate as the sole electron acceptor. At various intervals samples were withdrawn from the vessel while maintaining anaerobic conditions, and the bromate concentrations were measured. A reduction rate of 0.3 $\mu$g/min·mg protein was calculated from the linear part of the curve presented in FIG. 16, which is approximately 10% of the maximum reduction rate ($V_{max}$). The bromate reduction proceeded down to a level which was below the detection limit of the method used (<10 $\mu$g/l). This result demonstrates that washed cell suspensions of GR-1 are capable of removing bromate at concentrations which occur in drinking water.

4. A Fourth Series of Experiments was Carried out to Investigate the Biotechnological Removal of Chlorate and Bromate From Waste Water Using a Gas-Lift Reactor Effluents originating from incinerators contain chlorate and bromate. Increasingly stringent government regulations are being introduced. To meet these new regulations, the discharge of halo-oxo acids has to be reduced. Physico/chemical removal of the chlorate and bromate is feasible but expensive and again introduces new chemicals into the environment. The biological removal of both chlorate and bromate in a bioreactor using acetate as the sole source of carbon and energy has already proved successful. Hydrogen is a relatively abundant and clean energy source available at many sites which can replace acetate as reducing agent. A gas-lift reactor can be used for the biotechnological removal of both chlorate and bromate from waste water using hydrogen as the energy source.

OBJECTIVE

To assess the optimal process conditions in the gas-lift reactor treating (synthetic) waste water containing both chlorate and bromate.

To determine the influence of specific waste water characteristics on the removal efficiency of the reactor.

To determine the stability of the process at various chlorate and bromate concentration ratios.

SUMMARY

The influence of the waste water composition on the chlorate and bromate degradation rates in a gas-lift reactor was investigated. Complete removal of both chlorate and bromate with loading rates up to 20 g/l·d and 5 g/l·d for chlorate and bromate, respectively, was obtained in a gas-lift reactor at an HRT of 6 hours. High salt concentrations (up to 30 g/l) did not influence the reduction rates substantially, and adaptation of the micro-organisms to the high salinity was observed. Sulfite was not toxic to the micro-organisms, as shown by the limited inhibition of growth (7%) at a concentration of 405 mg/l. The micro-organisms immobilised on (pumice particles) in the reactor recovered from a toxic load of bromate (10 g/l·d) within 24 hours, and complete removal was observed after an operation period of 2 days. Optimal storage conditions for the active biomass are 4° C. under anaerobic conditions.

CONCLUSIONS

The results of the study clearly show that hydrogen is a viable energy source for the reduction of both chlorate and bromate in a gas-lift reactor. Complete removal can be maintained at short hydraulic retention times under practical conditions. The loading rate of bromate should not exceed 5 g/l·d, to avoid toxic effects. Other waste water characteristics have no significant negative effects on the performance of the reactor.

4. Experimental 4.1 Chemicals and Synthetic Waste Water

The mineral salts medium used contained the following minerals (per litre deionised water): 0.10 g $MgSO.7H_2O$; 0.50 g $(NH_4)_2HPO_4$; 3.10 g $K_2HPO_4$; 1.70 g $NaH_2PO_4$; 1.7 mg $Na_2SeO_3$; 0.13 mg $NiSO_4 \cdot 6H_2O$; 0.5 mg resazurin (redox indicator); 0.1 ml trace element solution (Vishniac and Santer).

Sodium bicarbonate was added separately using a solution of 1 g/l. The synthetic waste waters were prepared by adding various amounts of chlorate and bromate to the mineral medium. Sodium chlorate and potassium bromate were purchased from Fluka Chemie, Bornem, Germany. Hydrogen gas was purchased from BOC GAS, Zaventem, Belgium. All other chemicals were obtained from Janssen Chimica, Beerse, Belgium.

4.2 Gas-Lift Reactor

The gas-lift reactor was made of glass (MTB, Applikon, Schiedam, The Netherlands) with an external gas loop. The total volume of the reactor was 3.4 litres, with a working volume of 2.5 litres (1.3 l reactor and 1.2 l settler). The inner diameter was 260 mm, the Hliquid 480 mm. The reactor was filled with approximately 100 g/l pumice as carrier material (Aqua-volcano, dp:0.2–0.6 mm, d=2.4 kg/m³, Aquatechniek bv, Papendrecht, The Netherlands). The temperature was kept at 35° C. with a water jacket. Hydrogen was sparged into the reactor through a stainless steel sintered plate (20 $\mu$m). The gas flow was recycled with a compressor pump (Parker Hannifinn Corp., Sharon Mass, USA) at a flow rate of 180 l/h. The influent and effluent hydrogen gas flows and the total gas volume were monitored with mass flow controllers (Type 5850S controller, 5860S meter, and Flow computer 405A, Brooks Instrument bv, Veenendaal, The Netherlands) connected to a user interface program (Smart Control series 0160, Brooks, Veenendaal, The Netherlands). The pH was maintained at pH=7.5 with a 7.5% solution of phosphoric acid using a pH-electrode connected to a pH controller (ADI 1020, Applikon, Schiedam, The Netherlands). The synthetic waste water and the sodium hydrogen carbonate were supplied to the reactor separately using peristaltic pumps (Gilson Minipuls 3, Meyvis & Co., Bergen op Zoom, The Netherlands). All tubing used for the experimental set-up was made of PTFE.

4.3 Batch Studies

Batch experiments were conducted in 110 ml gas-tight glass vessels, which were filled with 10 ml of mineral medium. The gas-phase and the medium in the vessels were flushed with nitrogen. Hydrogen gas was supplied by injection of a known amount using a gas-tight syringe (up to 150 kPa). Vessels were incubated at 30° C. in a shaking water bath. Micro-organisms immobilised on pumice particles were withdrawn from the gas-lift reactor whenever steady state conditions were reached and washed twice with phosphate buffer (20 mM) before use. These immobilised micro-organisms were used to inoculate the cultures. Various salt concentrations in the batch cultures were obtained by adding various amounts of sodium chloride. Sodium sulfite was added to cultures in various amounts from a freshly prepared stock solution. The test vessels for the growth experiments were inoculated by injecting 5 ml of effluent from the reactor. The micro-organisms in the effluent were washed three times with phosphate buffer (20 mM) and concentrated to 0.5 ml by centrifugation (10,000 g, 15 min).

4.4 Analytical Procedures

Chloride was analysed by means of volumetric precipitation with silver nitrate. The equivalence point of the titration was determined potentio-metrically using a titro-processor model 672 and a dosimat 655 (Methrom AG, Herisau, Switzerland). The bromide was determined by the standard addition method using a solid state bromide electrode (model 94-35, Orion Research, Cambridge, USA) coupled to an mV meter (Consort P207, Salm-Kipp bv, Breukelen, The Netherlands). The chlorate and bromate were determined using a capillary zone electrophoresis apparatus (Prince, Lauerlabs, Emmen, The Netherlands). The CZE apparatus had a fused silica column (ID 50 mm, length 725 mm) and was equipped with a UV absorbance detector (Applied Biosystems 759 A, Foster City, USA) at 250 nm. The voltage setting for the electrophoresis was −30 kV in a buffer consisting of a mixture of pyromellitic acid, 2.3 mM, sodium hydroxide, 3.3 mM, and hexamethonium hydroxide, 1.3 mM, at pH=5. The hydrodynamic injection conditions were 0.2 min at 30 mbar.

4.5 Simultaneous Chlorate and Bromate Removal

Figure 17:
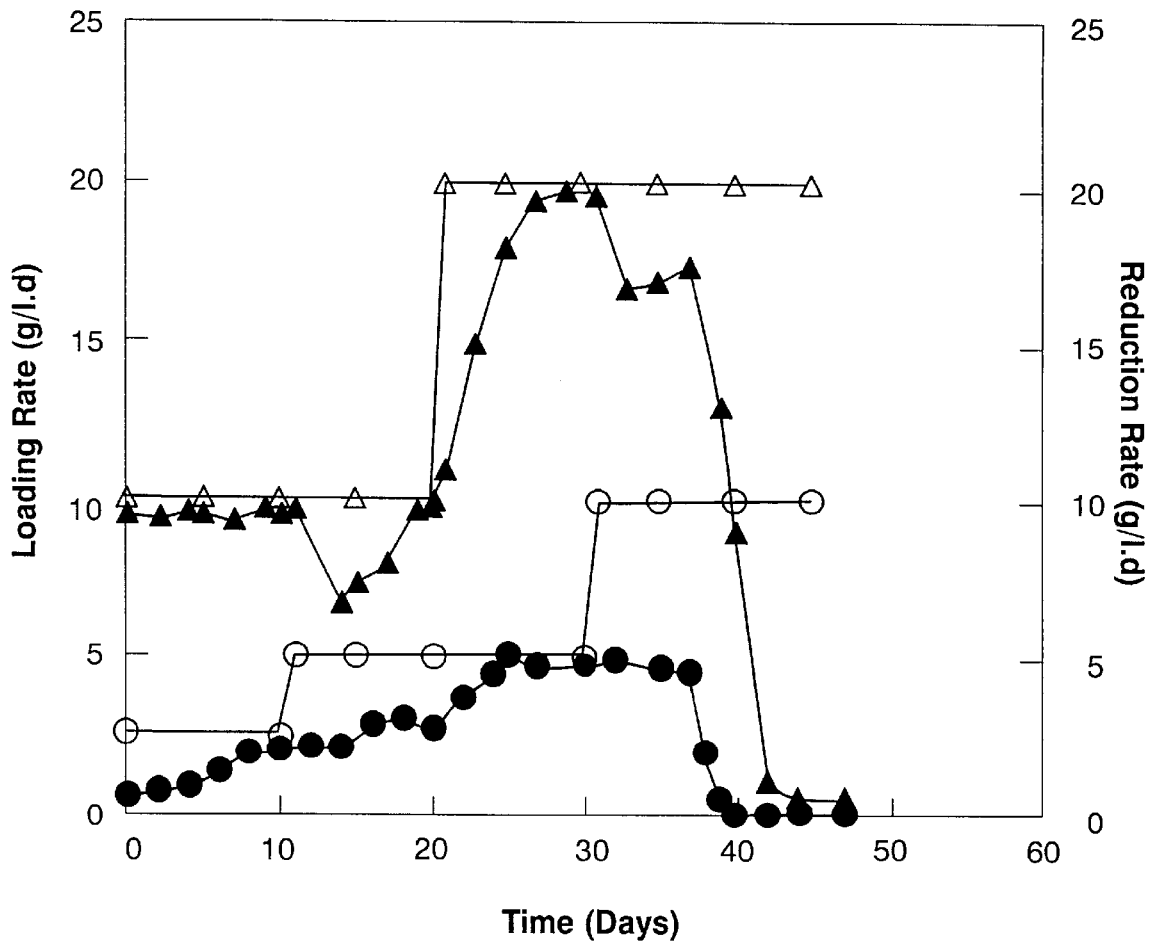
FIG. 17 shows the reduction of chlorate (▲) and bromate (●) in a gas-lift reactor at an HRT of 6 hours (the loading rates of both chlorate (Δ) and bromate (○) were increased stepwise)

Effluent from an incinerator contained both bromate and chlorate in various ratios. To investigate whether the bromate could also be reduced by the chlorate-reducing micro-organisms, synthetic waste water containing both chlorate and bromate was used as influent for the gas-lift reactor. Earlier studies having indicated that bromate was toxic to micro-organisms at low concentrations, the bromate concentration in the influent was increased stepwise to avoid acute toxicity to the biomass. The hydraulic retention time (HRT) was set at 6 hours during all experiments. As shown in FIG. 17, an almost complete reduction of both chlorate and bromate was observed after 10 days of operation with a loading rate of 10 and 2.5 g/l·d for chlorate and bromate, respectively. An increase in the bromate loading rate to 5 g/l·d did not result in an increase in removal, even after a period of 10 days. The chlorate removal, however, was disturbed momentarily due to the increase in bromate load. After an increase of the chlorate loading rate from 10 to 20 g/l·d, the bromate removal subsequently increased to 5 g/l·d. A further increase of the bromate load to 10 g/l·d resulted in a complete inactivation of the biomass, and eventually in a decline in the reduction rate to zero for both chlorate and bromate. This indicates that bromate exerts a toxic effect which depends both on the bromate concentration in the reactor and on the ratios of chlorate and bromate. The addition of urea and activated carbon as detoxifying agents did not result in any improvement in the removal of bromate at high concentrations.

4.6 Effect of Sulfite and Bromate on Biomass Activity

Besides chlorate and bromate the waste water also contains small amounts of hypochlorite. Since hypochlorite is a biocide, removal of this compound before biological treatment is necessary. Hypochlorite can be removed instantly from the waste water using sulfite as reductant. This procedure could be used prior to the biological treatment. To examine whether sulfite is toxic to micro-organisms immobilised on the pumice particles, a toxicity test was performed. A bacterial growth inhibition test was performed at various concentrations, as shown in Table 4. Growth was determined after 5 days, and was compared to a control culture without sulfite. The growth was determined by measuring the formation of chloride. As shown, no substantial inhibition of growth was observed even upon the addition of 405 mg/l sulfite, which indicates that the addition of sulfite is non-toxic to micro-organisms immobilised on pumice particles.

Figure 18:
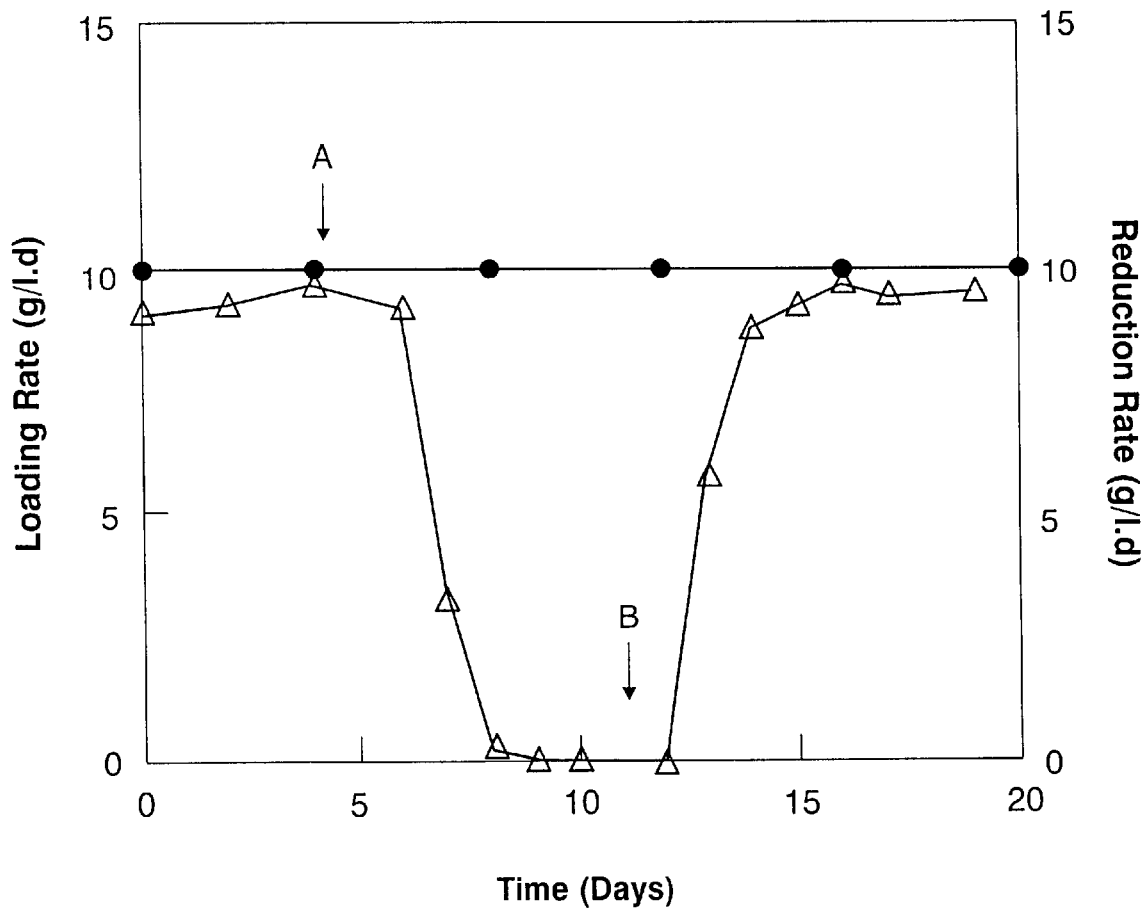
FIG. 18 shows the effect of a shock load of bromate concentration (shock load) on the reduction rate (Δ) of chlorate in the gas-lift reactor at an HRT of 6 hours. The chlorate loading rate (●) was 10 g/l·d (on day 4 (Δ) bromate was added, resulting in a bromate load of 10 g/l·d. On day 12 (B) the bromate was removed from the influent)

The recovery of the active biomass from a (shock) load of bromate was remarkable, as shown in FIG. 18. After a sudden increase in the loading rate of bromate (10 g/l·d), the chlorate reduction rate was decreased to 0 g/l·d. Within 24 hours after omitting bromate from the influent, the reduction of chlorate started again and within 2 days the complete reduction of chlorate was evident. These results indicate that the toxicity of bromate on the biomass was reversible.

4.7 Influence of High Salt Concentration on Microbial Activity

Figure 19:
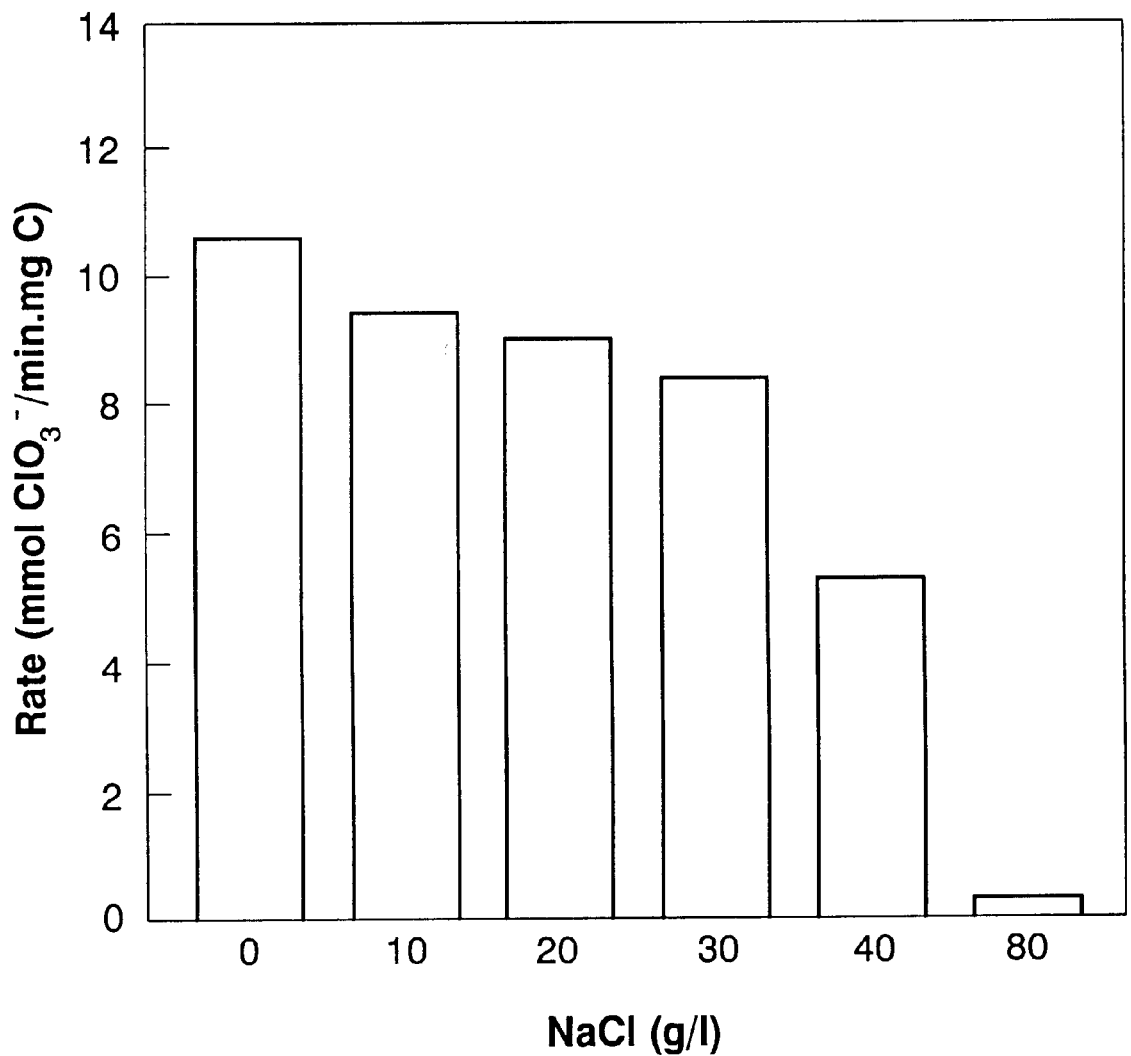
FIG. 19 shows the effect of salinity on the chlorate reduction rate of the micro-organisms immobilised on pumice particles (batch cultures were augmented with various amounts of sodium chloride)
Figure 20:
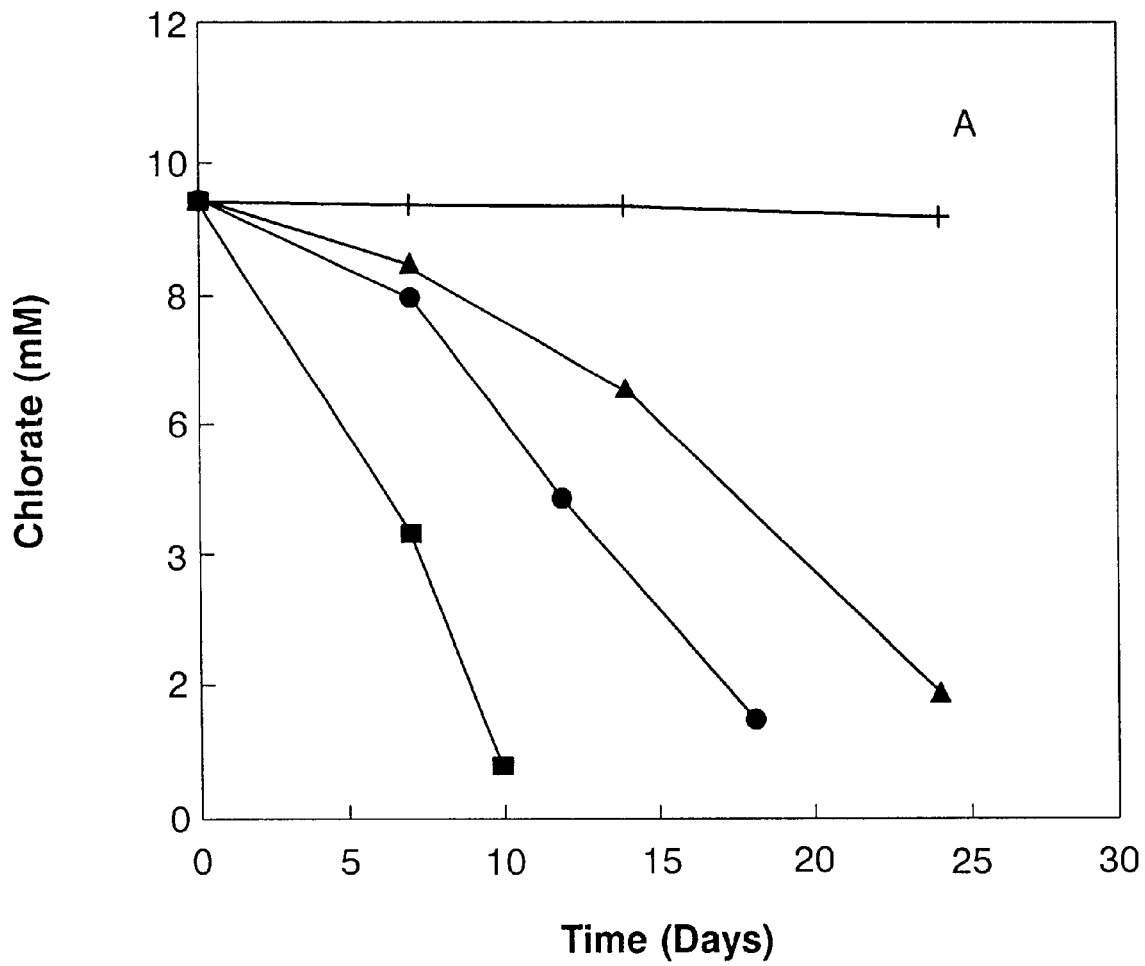
FIGS. 20 and 21 show the effect of salinity on the growth of chlorate-reducing micro-organisms (the growth curves in the first experiment (A), see FIG. 20, were obtained with unadapted sludge from the gas-lift reactor; in the second experiment (B), see FIG. 21, sludge from the first experiment was used as inoculum; the following concentrations of sodium chloride were added to the vessels: control (■), 10 g/l (●), 20 g/l (▲), and 40 g/l (+))
Figure 21:
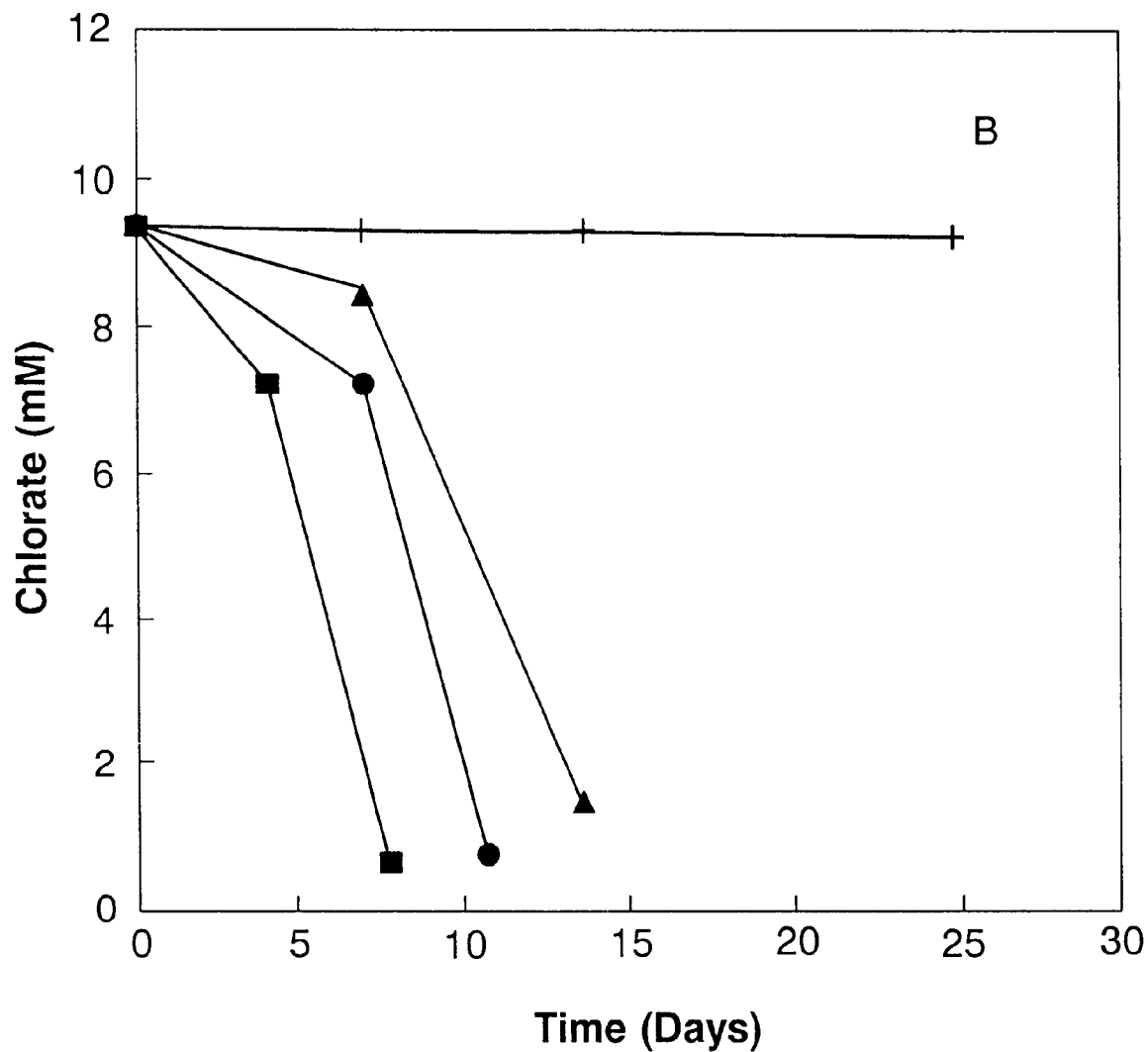

The effect of increased salt concentration in the reactor was investigated in batch experiments. The activity of the micro-organisms immobilised on pumice particles in the batch experiment decreased only slightly with increasing salinity, as indicated in FIG. 19. A high activity of more than 80% of the maximum was still observed at a concentration of 30 g/l sodium chloride. The effects of increased salinity were substantial at concentrations of 40 g/l These experiments were performed with unacclimatised micro-organisms. To investigate the adaptation of micro-organisms immobilised on pumice particles to high salt concentrations, growth experiments were performed. The curves in FIGS. 20 and 21 indicate that the growth of the micro-organisms was delayed with increasing salt concentration (FIG. 20A). When these cultures were used as inoculum for a second experiment (FIG. 21B), the delay in growth was less explicit than in the initial experiment, indicating adaptation to a high salt concentration.

4.8 Stability of the Micro-organisms Immobilised on Pumice Particles after Storage at Various Temperatures The stability of the micro-organisms immobilised on pumice particles is presented in Table 5. The results of the stability experiments show that colonised pumice particles are stable for long periods of time when stored at 4° C. in the dark under anaerobic conditions. Even after 18 weeks of storage more than 40% of the initial activity was still present.

TABLE 4

Inhibition of growth by sodium sulfite after 5 days of incubation in a batch culture. Chlorate was added as the sole electron acceptor and hydrogen and sodium bicarbonate were added as the energy and carbon source. Growth was measured based on chloride formation.

| Sulfite | Chloride (mg/l) | | Growth inhibition |
|---|---|---|---|
| (mg/l) | t = 0 | t = 5 (days) | (%) |
| Control | <5 | 415 | — |
| 15 | <5 | 398 | 4 |
| 45 | <5 | 415 | 0 |
| 135 | <5 | 391 | 6 |
| 405 | <5 | 387 | 7 |

TABLE 5

Stability of the pumice particles after storage at various temperatures. The activity was measured in batch cultures directly after withdrawal from the storage vessels.

| Storage time | Chlorate reduction rate (mmol/min · mg biomass-C) | | |
|---|---|---|---|
| (weeks) | −20° C. | 4° C. | 20° C. |
| 0 | 0.22 | 0.34 | 0.22 |
| 4 | 0.04 | 0.28 | 0.05 |
| 10 | 0.02 | 0.22 | 0.01 |
| 18 | <0.01 | 0.14 | <0.01 |

A fifth series of experiments was carried out to investigate the reduction of bromate to bromide coupled to acetate oxidation by enrichment cultures in columns where micro-organisms employed bromate as the sole electron acceptor for acetate oxidation.

5.1 Materials and Methods

Figure 22:
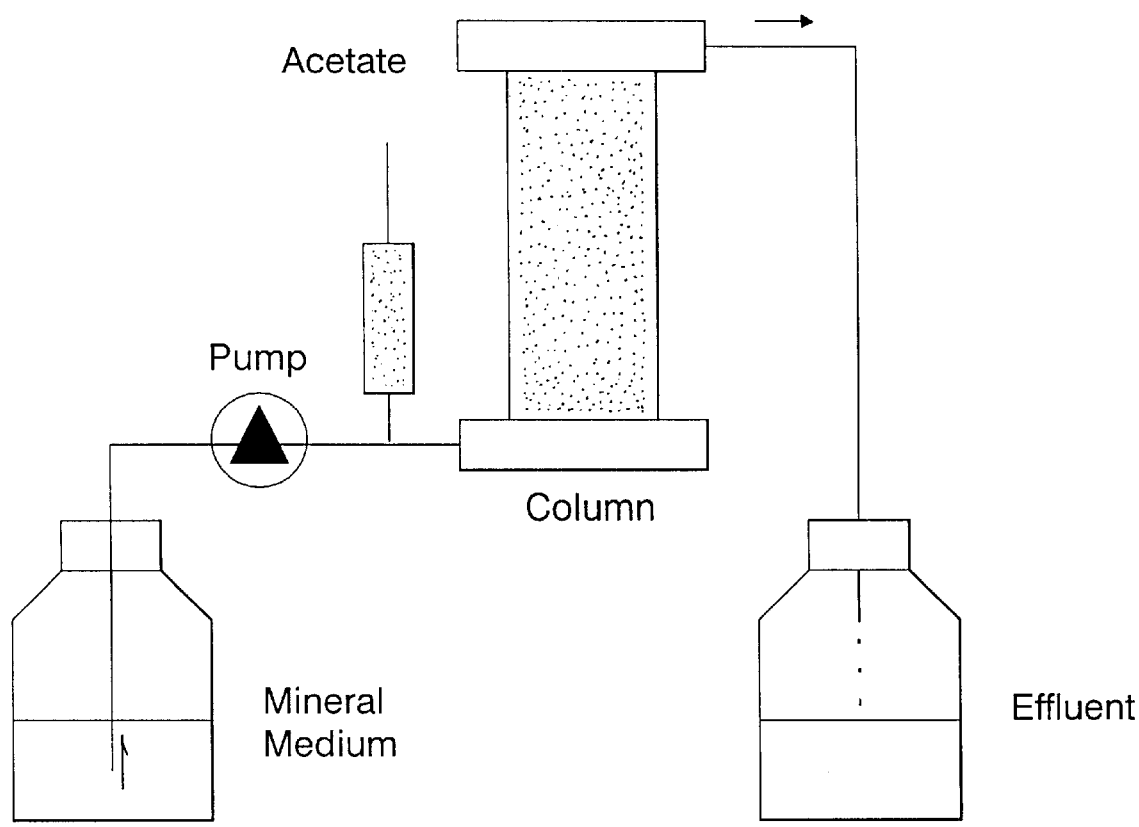
FIG. 22 shows a schematic diagram of the continuously fed packed-bed reactor used for the laboratory-scale experiments.

The experiments were performed in an upflow packed-bed reactor. The columns used were made of glass with a working volume of 250 ml (FIG. 22). One column was packed with soil The other column was filled with digested sludge. The mineral salts medium used contained the following minerals (per litre deionised water): 0.2 g $KBrO_3$, 0.1 g $MgSO_4.07H_2O$; 0.50 g $(NH_4)_2HPO_4$; 1.55 g $K_2HPO_4$; 0.85 g $NaH_2PO_4$; 1.7 mg $Na_2SeO_3$; and 0.1 ml trace element solution (Vishniac, W., Santer, M. (1957) The Thiobacilli. Bacteriological Reviews 21, 159–231). The medium was continuously pumped into the reactor by means of a peristaltic pump with marprene tubing. Acetate as a concentrated solution was introduced into the columns with a syringe pump by spiking the mineral salts medium. The content of acetate was 150 mg/l. The flow was 250 ml/day giving a hydraulic retention time of 1 day.

The bromate and bromide were determined by ion chromatography (Dionex -120) using (suppressed) conductivity detection. The column was an Ionpac AS-9-HC+AG9-HC. The eluent consisted of 9 mM $Na_2CO_3$ at a rate of 1 ml/min. The injection volume was 1 $\mu l$.

The non-purgeable organic carbon (NPOC) contents were determined using a TOC analyzer (Shimadzu Corporation, Kyoto, Japan). Samples from the influent and effluent streams were passed through a membrane filter (8 $\mu m$ pore diameter) prior to analysis. Samples were acidified prior to injection into the TOC apparatus.

Results

Anaerobic continuous-flow packed-bed columns were established with sludge from a digester and soil from a garden, respectively, and fed with bromate and acetate for 4 months. During the experiments the hydraulic retention time was set at one day. These columns were used to investigate the ability of micro-organisms to reduce bromate according to the following reaction:

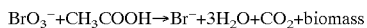

Figure 23A:
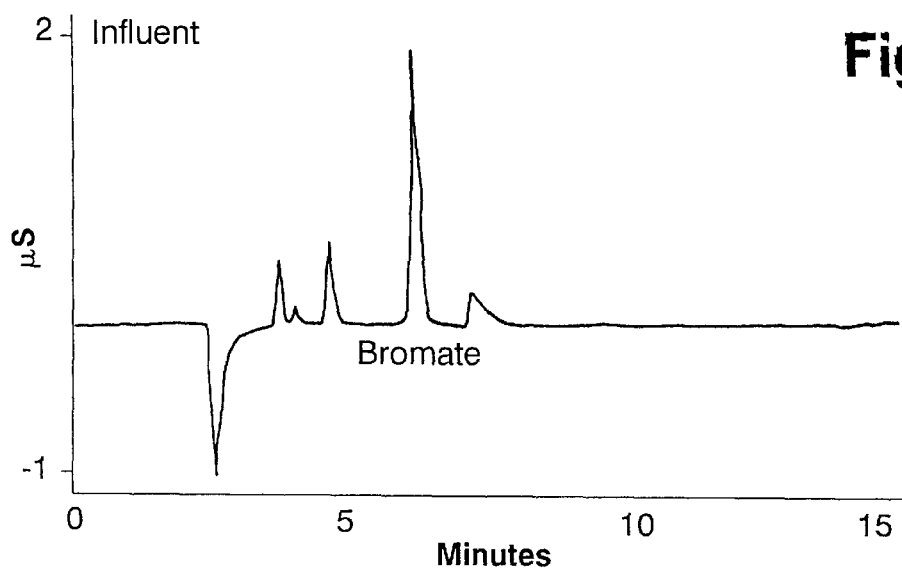
FIG. 23 shows chromatograms showing the removal of bromate from the influent and the formation of bromide in the columns packed with soil and sludge.
Figure 23B:
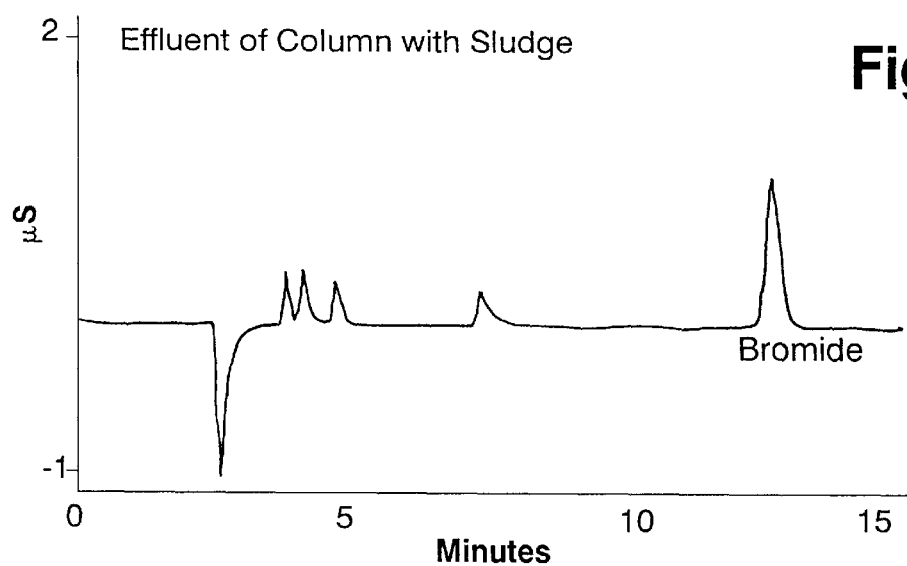
Figure 23C:
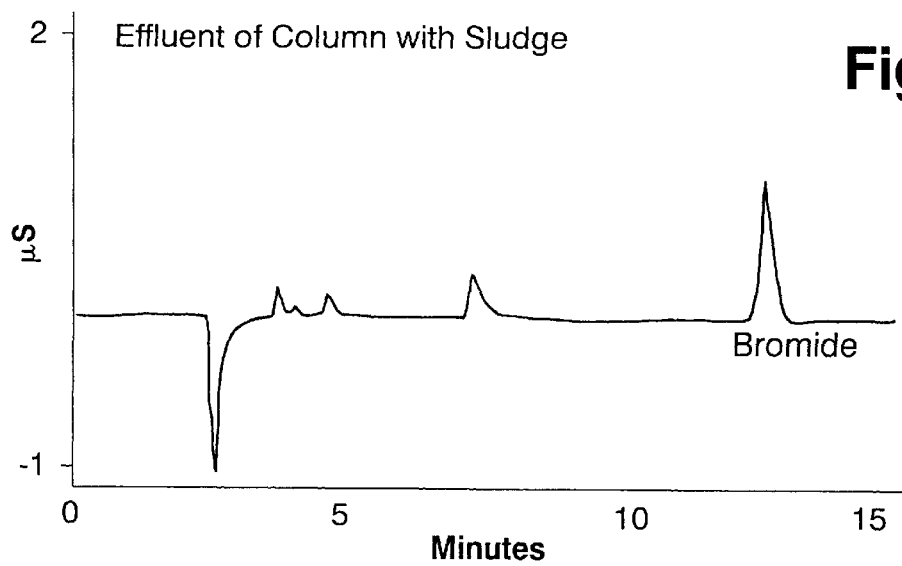
Figure 24:
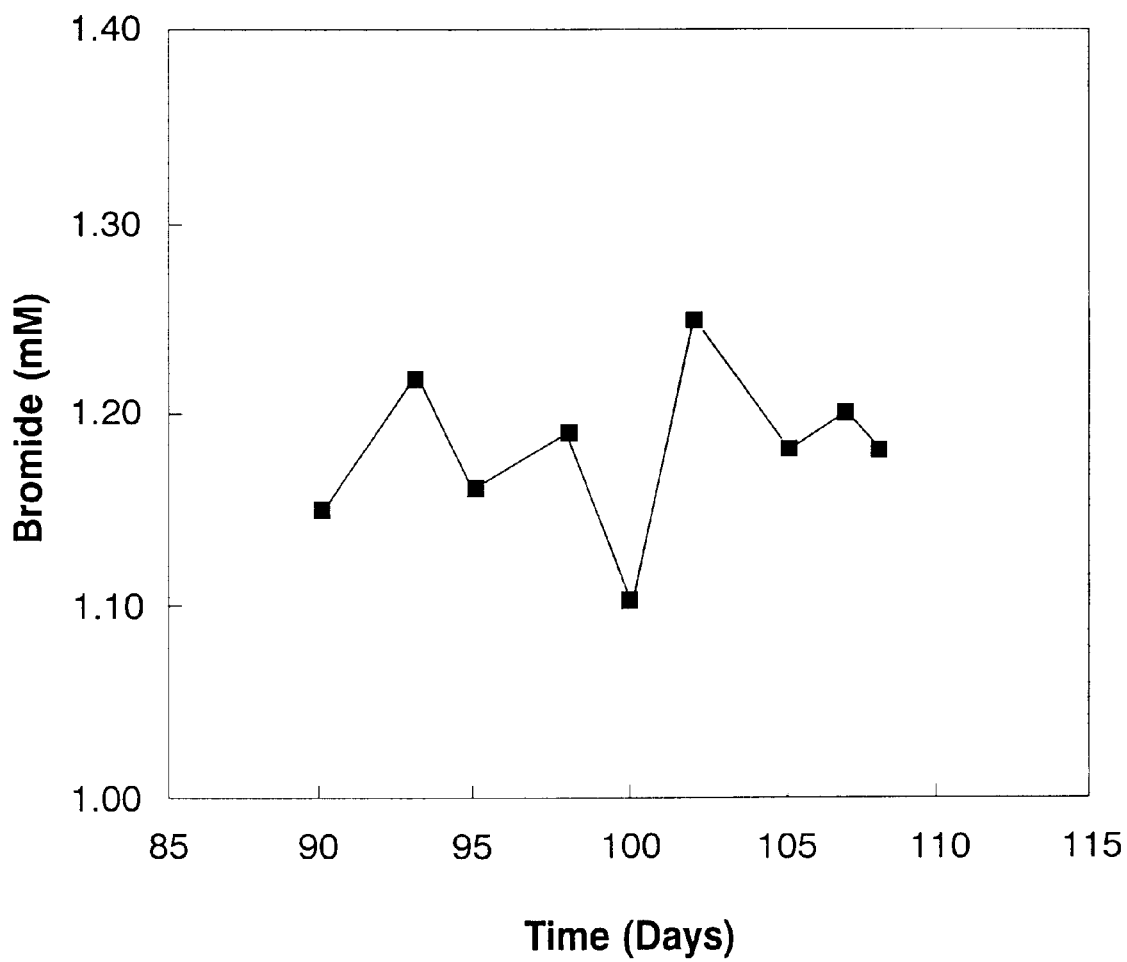
FIG. 24 shows the formation of bromide under steady state conditions.
Figure 25:
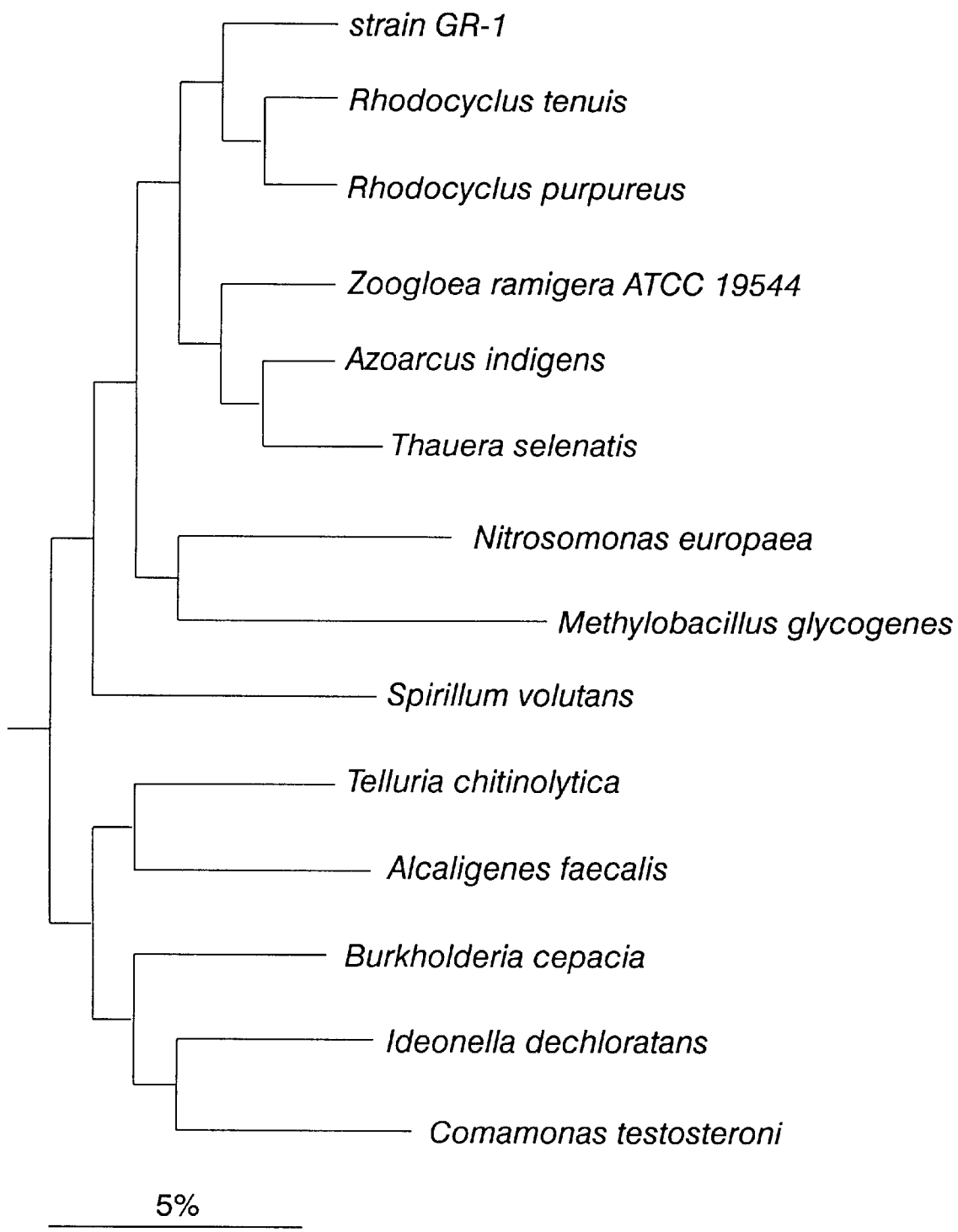
FIG. 25 shows a phylogenetic dendrogram indicating the position of strain GR-1 within the radiation of the representatives of the beta proteobacteria. The scale bar represents 10 nucleotide substitutions per 100 nucleotides.

After a period of 2 months complete bromate reduction was evident in both columns, as demonstrated by the recovery of 100% bromide (FIG. 23). After three months steady state conditions were assumed in the column packed with soil The formation of bromide is shown in FIG. 24. Under these conditions the consumption of acetate was estimated by measuring the NPOC (non-purgeable organic carbon) content in the influent and the effluent of the packed-bed. The carbon consumed in the reactor was determined to be 16 mg/day excluding acetate-carbon consumption by methanogenic bacteria (this was determined by measuring the biogas formation). The amount of acetate oxidized during the reduction of bromate in the reactor predicted by the equation for complete reduction of bromate without biomass formation is 12.3 mg/day of acetate-carbon. The acetate consumed without the concurrent loss of bromate has to be utilized for biomass production. The mass balance of carbon of this experiment demonstrates the existence of bromate-respiring micro-organisms capable of reducing bromate completely.

The invention is not limited to the above description, rather, the requested rights are determined by the following claims.

What is claimed is:

1. A process for the removal of undesirable bromine salts from fluid streams, comprising the step of exposing the fluid stream to a micro-organism belonging to a group of bromate respiring bacteria, whereby the micro-organism biochemically aids in the reduction of the undesirable bromine salts.

2. The process according to claim 1, wherein the micro-organism transforms an energy source in the fluid stream into an electron donor, with the undesirable bromine salts functioning as electron acceptors to accept electrons from the donor and being reduced.

3. The process according to claim 2, wherein the electron donor comprises a carbon source and/or hydrogen gas.

4. The process according to claim 3, wherein the carbon source comprises:
carbon dioxide, acetate, propionate, ethanol, methanol, succinate, malate, lactate, formate, glucose, and/or glycine.

5. The process according to claim 1, wherein the fluid stream has an electron acceptor which consists essentially of undesirable bromine salts.

6. The process according to claim 5, wherein the electron acceptor is bromate.

7. The process according to claim 1, wherein the fluid stream has an electron acceptor which comprises chlorate, perchlorate and/or bromate.

8. The process according to claim 1, wherein the micro-organisms are obtained by the enrichment of activated sludge or other sources of micro-organisms with an energy source and an electron acceptor under anaerobic conditions, and the electron acceptor comprises one or more of the following: perchlorate, chlorate and/or bromate.

9. The process according to claim 1, wherein the micro-organisms are obtained by means of cultivating an isolated micro-organism.

10. The process according to claim 1, wherein the micro-organisms are utilized in the form of washed cell suspensions.

11. The process according to claim 1, wherein the fluid stream is an aqueous waste stream.

12. The process according to claim 11, wherein the aqueous waste stream is from a waste water treatment installation.

13. The process according to claim 1, wherein the fluid stream has an electron acceptor which comprises chlorate and/or bromate, and reduction of the chlorate and/or bromate is carried out at a pH of between 4–11 and at a temperature of between 20–40° C.

14. The process according to claim 13, wherein the reduction of the chlorate and/or bromate is carried out at a pH of between 5–10 and at a temperature of between 30–35° C.

15. The process according to claim 13, wherein the reduction of the chlorate and/or bromate is carried out at a pH of between 6–10 and at a temperature of between 30–35° C.

16. The process according to claim 13, wherein the reduction of the chlorate and/or bromate is carried out at a pH of between 7.5–9.5 and at a temperature of between 30–35° C.

17. The process according to claim 1, wherein the micro-organism includes bacteria of the β subgroup of bacteria designated GR-1.

18. The process according to claim 17, wherein GR-1 transforms 100–1000 mg bromate per litre reactor volume per day into bromide.

19. The process according to claim 18, wherein GR-1 transforms 200–500 mg bromate per litre reactor volume per day into bromide.

* * * * *